United States Patent
Boffa et al.

(10) Patent No.: US 11,635,294 B2
(45) Date of Patent: *Apr. 25, 2023

(54) STATION FOR CHECKING TYRES FOR VEHICLE WHEELS

(71) Applicant: PIRELLI TYRE S.P.A., Milan (IT)

(72) Inventors: Vincenzo Boffa, Milan (IT); Luca Tersi, Imola (IT); Valeriano Ballardini, Imola (IT)

(73) Assignee: PIRELLI TYRE S.P.A., Milan (IT)

( * ) Notice: Subject to any disclaimer, the term of this patent is extended or adjusted under 35 U.S.C. 154(b) by 211 days.

This patent is subject to a terminal disclaimer.

(21) Appl. No.: 17/125,557

(22) Filed: Dec. 17, 2020

(65) Prior Publication Data

US 2021/0108913 A1    Apr. 15, 2021

Related U.S. Application Data

(63) Continuation of application No. 16/320,465, filed as application No. PCT/IB2017/054501 on Jul. 25, 2017, now Pat. No. 10,900,774.

(30) Foreign Application Priority Data

Jul. 26, 2016 (IT) .......................... 102016000078215

(51) Int. Cl.
*G01B 11/24* (2006.01)
*G01M 17/02* (2006.01)

(52) U.S. Cl.
CPC ....... *G01B 11/2408* (2013.01); *G01M 17/027* (2013.01); *G01B 11/24* (2013.01)

(58) Field of Classification Search
CPC .. G01B 11/24; G01B 11/2408; G01M 17/027; G01M 17/02; A61K 2300/00;

(Continued)

(56) References Cited

U.S. PATENT DOCUMENTS

| 4,032,785 A | 6/1977 | Green et al. |
| 9,239,274 B2 | 1/2016 | Joly |

(Continued)

FOREIGN PATENT DOCUMENTS

| CN | 101358839 A | 2/2009 |
| CN | 101896865 A | 11/2010 |

(Continued)

OTHER PUBLICATIONS

Communication pursuant to Article 94(3) EPC issued for European Application No. EP 17772093.5 filed on Jul. 25, 2017, on behalf of Pirelli Tyre S.P.A. dated Nov. 11, 2021. 4 Pages.

(Continued)

*Primary Examiner* — Tri T Ton

(74) *Attorney, Agent, or Firm* — Steinfl + Bruno, LLP

(57) ABSTRACT

A station for checking a tyre for vehicle wheels. The checking station includes a background with a support surface lying on a plane perpendicular to a reference axis, an image acquisition apparatus to acquire an image of the tyre arranged with a first outer lateral surface in contact with the support surface and a second outer lateral surface facing the image acquisition apparatus, an illumination system and a computer for generating a working image from the acquired image. The image acquisition apparatus, the illumination system and of the background are arranged to generate a contrast, in the working image, between the entire second outer lateral surface of the tyre and an area circumferentially surrounding the tyre.

26 Claims, 9 Drawing Sheets

(58) Field of Classification Search
CPC .... A61K 31/225; A61K 31/41; A61K 9/2013; A61K 9/2054; A61K 9/4808; A61P 9/04
USPC .................................................. 356/600–640
See application file for complete search history.

(56) References Cited

U.S. PATENT DOCUMENTS

| | | | |
|---|---|---|---|
| 9,719,944 | B2 | 8/2017 | Boffa et al. |
| 9,835,524 | B2 | 12/2017 | Boffa et al. |
| 10,451,527 | B2 | 10/2019 | Boffa et al. |
| 10,458,883 | B2 | 10/2019 | Boffa et al. |
| 10,900,774 | B2 | 1/2021 | Boffa |
| 2009/0033949 | A1 | 2/2009 | Braghiroli |
| 2011/0018999 | A1 | 1/2011 | Joly et al. |
| 2014/0125792 | A1 | 5/2014 | Yoshimatsu et al. |
| 2014/0341460 | A1 | 11/2014 | Ballabio et al. |
| 2016/0258842 | A1* | 9/2016 | Taylor ............... G01B 11/22 |
| 2018/0172557 | A1* | 6/2018 | Ghidotti Piovan ..... G06T 7/001 |
| 2019/0271539 | A1 | 9/2019 | Boffa et al. |
| 2020/0400590 | A1 | 12/2020 | Boffa et al. |

FOREIGN PATENT DOCUMENTS

| | | |
|---|---|---|
| CN | 102203578 A | 9/2011 |
| CN | 103234530 A | 8/2013 |
| CN | 103687718 A | 3/2014 |
| CN | 104204762 A | 12/2014 |
| CN | 104541145 A | 4/2015 |
| CN | 105378447 A | 3/2016 |
| EP | 1826529 A1 | 8/2007 |
| WO | 2014/117870 A1 | 8/2014 |
| WO | 2017/085651 A1 | 5/2017 |
| WO | 2017/199173 A9 | 11/2017 |
| WO | 2017/208093 A1 | 12/2017 |
| WO | 2019/123327 A1 | 6/2019 |

OTHER PUBLICATIONS

International Preliminary Report on Patentability for International Application No. PCT/IB2018/060361 filed on Dec. 19, 2018 on behalf of Pirelli Tyre S.P.A. dated Jun. 23, 2020 7 pages.
International Search Report for International Application No. PCT/IB2018/060361 filed on Dec. 19, 2018 on behalf of Pirelli Tyre SPA, dated Mar. 25, 2019. 4 pages.
Non-Final Office Action for U.S. Appl. No. 16/772,116, filed Jun. 11, 2020 on behalf of Pirelli Tyre S.P.A. dated Oct. 26, 2021 8 pages.
Second Chinese Office Action + Search Report for CN Application No. 201780056811.5 filed on Jul. 25, 2017, on behalf of Pirelli TyreS.P.A. dated Mar. 17, 2021. 11 Pages (English + Original).
Third Chinese Office Action Action + Search Report for CN Application No. 201780056811.5 filed on Jul. 25, 2017, on behalf of Pirelli Tyre S.P.A. dated Aug. 23, 2021. 23 pages (English + Original).
Written Opinion for International Application No. PCT/IB2018/060361 filed on Dec. 19, 2018 on behalf of Pirelli Tyre SPA, dated Mar. 25, 2019. 6 pages.

* cited by examiner

STATION FOR CHECKING TYRES FOR VEHICLE WHEELS

CROSS REFERENCE TO RELATED APPLICATIONS

The present application is a continuation of U.S. patent application Ser. No. 16/320,465, filed on Jan. 24, 2019, which is the U.S. National Stage of International Patent Application No. PCT/IB2017/054501 filed on Jul. 25, 2017 which, in turn, claims priority to Italian Application No. 102016000078215 filed on Jul. 26, 2016, the contents of each which are incorporated herein by reference in their entirety.

FIELD

The invention concerns a method and a station for checking tyres for vehicle wheels.

The present invention is in the field of checks carried out on tyres, preferably moulded and vulcanized, adapted for verifying the conformity thereof to the design specifications and, in particular, for detecting possible external defects (on the outer and/or inner surface) and/or defects inside the structure of the tyre and thus for allowing those conforming to the standard to be sent to storage and the defective ones to be discarded.

BACKGROUND

A tyre for vehicle wheels typically comprises a carcass structure, configured according to a substantially toroidal configuration, comprising at least one carcass ply having respectively opposite end edges. The latter are engaged at respective annular anchoring structures, each of them normally formed from at least one substantially circumferential annular insert called "bead core" on which at least one filling insert is generally applied, tapering radially away from the rotation axis. The annular anchoring structures are arranged in areas usually identified with the name "beads". The beads have an inner diameter substantially corresponding to a so-called "fitting diameter" of the tyre on a respective mounting rim. The tyre also comprises a crown structure comprising at least one belt strip arranged in radially outer position with respect to the carcass ply with respect to the rotation axis of the tyre and a radially outer tread band with respect to the belt strip. On the tread band there are typically shaped longitudinal and transversal grooves, arranged to define a desired tread pattern. Between the tread band and the belt strip(s) it is possible to arrange a so-called "underlayer" made of elastomeric material having properties suitable for ensuring a stable connection of the belt strip(s) with the tread band itself.

On the side surfaces of the carcass structure, each extending from one of the side edges of the tread band up to the respective annular anchoring structure to the beads, there are also applied—in axially outer position—respective sidewalls made of elastomeric material.

The whole of the portion of each sidewall close to the respective side edge of the tread band and of each portion of the tread band close to the respective sidewall is known as "shoulder" of the tyre.

In "tubeless" tyres, there is, in a radially inner position with respect to the carcass ply, at least one layer of elastomeric material, usually called "liner", having air-tightness characteristics and generally extending from one bead to another.

The production cycles of a tyre foresee that, following a building process in which the various structural components of the tyre itself are made and/or assembled, the built green tyres are transferred into a moulding and vulcanization line where a moulding and vulcanization process is carried out, adapted for defining the structure of the tyre according to a desired geometry and tread pattern.

The term "elastomeric material" is meant to indicate a composition comprising at least one elastomeric polymer and at least one reinforcing filler. Such a composition can also comprise additives like, for example, a cross-linking agent and/or a plasticizer. Thanks to the presence of the cross-linking agent, such a material can be cross-linked through heating, so as to form the final manufactured product.

The term "green tyre" is meant to indicate a tyre obtained by the building process and not yet moulded and vulcanized.

The term "finished tyre" is meant to indicate a tyre obtained by the building process and subsequently moulded and vulcanized.

The term "tyre" is meant to indicate a finished tyre or a green tyre.

The term "model" of tyre, is meant to indicate the set of geometric characteristics that distinguishes a tyre, namely, for example, width of the section, height of the sidewalls, fitting diameter and/or external diameter.

The term "type" of tyre is meant to indicate the whole of the structural characteristics (like for example single or two-ply structure, radial or having cross carcass plies, with or without belt structure, belt structure type—crossed belts, zero degrees, crossed belts and zero degrees —, tread band type having one or more layers, etc.), and technologies (like for example rubber compound of the various structural components, materials making up the textile or metallic reinforcing cords, type of formation of the reinforcing cords, etc.).

The terms "axial", "axially", "radial", "radially", "circumferential" and "circumferentially" are used with reference to the tyre.

In particular, the terms "axial" and "axially" are meant to indicate references/magnitudes arranged/measured or extending in a direction substantially parallel to the rotation axis of the tyre.

The terms "radial" and "radially" are meant to indicate references/magnitudes arranged/measured or extending in a direction that intersects the rotation axis of the tyre and lies in a plane perpendicular to such a rotation axis.

The terms "circumferential" and "circumferentially" are meant to indicate references/magnitudes arranged/measured or extending along a circumference developing around the rotation axis of the tyre.

The term "axial half of the tyre" is meant to indicate a half of the tyre delimited by an axial middle plane perpendicular to the rotation axis of the tyre and equidistant from the beads of the tyre itself.

The term "at least one axial half of the tyre" is meant to indicate a complete half as defined above, possibly a further portion of the other half that extends axially from the aforementioned middle plane.

The term "building/production cycle time" is meant to indicate the time that passes between the exit of a built/finished tyre from a building/production line, and the exit of the next tyre.

The term "checking cycle time" is meant to indicate the time that passes between the exit of a checked tyre from a checking line and the exit of the next tyre.

The terms "horizontal", "vertical", "lower", "upper", "bottom", "top", "above" identify the relative position of an element, like for example a component of a tyre, a tyre, an apparatus, a device, etc., with respect to the ground or of one of said elements with respect to another element.

The term "tyre surface" is meant to indicate the entire surface of the finished tyre.

The terms "outer surface" and "inner surface" of the tyre are meant to indicate the surface that remains visible after the coupling of the tyre with its mounting rim and that no longer visible after said coupling, respectively.

The term "outer side surface" of the tyre indicates the outer surface of a sidewall and of the respective bead and shoulder.

The term "digital image", or equivalently "image", is meant to indicate in general a set of data, typically contained in a computer file, wherein each n-tuple of coordinates (typically each pair of coordinates) of a finite set (typically two-dimensional and matrix-type, i.e. N rows×M columns) of n-tuples of spatial coordinates (each n-tuple corresponding to a "pixel") is associated with a corresponding set of numerical values (which can be representative of magnitudes of a different type). For example, in monochromatic images (like those on the 'grayscale') such a set of values consists of a single value in a finite scale (typically having 256 levels or tones from 0 (black) to 255 (white)), such a value being for example representative of the level of intensity (or luminosity) of the respective n-tuple of spatial coordinates when visualized. A further example is represented by the colour images, wherein the set of values represents the level of intensity of a multiplicity of colours, or channels, typically the primary colours (for example in the RGB code red, green and blue, whereas in the CMYK code cyan, magenta, yellow and black). The term 'image' does not necessarily imply the effective visualization thereof.

Every reference to a specific "digital image" (for example the digital image acquired on the tyre) more generally includes any digital image able to be obtained through one or more digital processing of said specific digital image (like for example filtering, equalizations, 'smoothing', binarizations, thresholding, morphological transformations ('opening', etc.), derivative or integral calculations, etc.).

The term "two-dimensional image" or "2D" means a digital image each pixel of which is associated with information representative of the reflectivity/diffusivity and/or of the colour of the surface, such as the images detected by common digital camera or video cameras (e.g. with CCD or CMOS).

The term "angularly uniform illumination" with respect to an axis indicates an illumination whereby any two points, taken along a circumference that develops around said axis, are illuminated with a light power that differs at most by 30%, more preferably by 10%.

The term "symmetrical illumination" with respect to an axis indicates an illumination whereby any two points, symmetrically arranged with respect to said axis, are illuminated with a light power that differs at most by 30%, preferably by 10%.

The term "scialytic illumination" indicates an illumination obtained with a plurality of light beams that intersect so as to minimize the presence of shadows.

The term "background", referring to a checking station for checking a tyre, indicates the space inside the checking station outside of the tyre to be checked.

The term "side view", relative to a tyre, indicates a view that makes it possible to comprise at least sidewall and/or bead and/or a shoulder portion of the tyre, in other words that makes it possible to comprise at least one portion of outer side surface of the tyre. Preferably, it is meant to indicate a view substantially according to the rotation axis of the tyre.

In a production process, the tyres are subjected to checks in order to verify the possible presence of defects and/or production anomalies.

For example, WO2016/088040 describes an apparatus for checking tyres comprising a first checking unit and a second checking unit and an overturning and transport device operatively arranged between the first checking unit and the second checking unit. The first checking unit, the second checking unit and the overturning and transport device define a checking path configured so as to be crossed by each tyre step by step. The first checking unit and the second checking unit comprise checking tools configured to carry out checks on respective axial halves of the tyres. The checking tools comprise, for example, video cameras, light sources (laser lights, LEDs, etc.), mirrors and pressing elements (rollers, cylinders).

EP 2 141 476 describes a system for evaluating the quality of a tyre comprising a light source for illuminating the tyre to be checked, a diffraction grating arranged on the same axis between the light source and the tyre, photographic means for acquiring an image of the tyre having a sinusoidal pattern on its surface formed by the light diffracted by the grating and an analyser to determine characteristics of uniformity of the tyre, in terms of deviation from a perfect roundness of the outer circumference of the tyre. EP 2 141 476 describes, before acquiring images of the tyre, applying a white substance (such as powdered material or lacquer) on the surface of the tyre so as to obtain a distinct image with the aforementioned sinusoidal pattern.

The Applicant has observed that the technique used by EP 2 141 476 of applying a white substance on the surface of the tyre, before the acquisition of an image thereof, requires application times that impact on the checking cycle time, lengthening it. In order to make an automated checking system inside an industrial production plant with high productivity, this can result in problems of compatibility with the production cycle time set by the line itself and the accumulation of tyres to be checked. Moreover, the Applicant has observed that such a technique, by altering the surface of the tyre, does not lend itself to being used in an automated checking system in which the tyre is subjected to a plurality of checks, including the checks adapted for detecting possible defects on the surface of the tyre.

The Applicant has perceived the need to carry out the aforementioned checks accurately on all of the tyres coming out from a tyre production line, with times and modes compatible with the production cycle time, also in plants that produce a large number of tyre models that are different from each other in type and/or model. Such checks can also be preliminary with respect to those implemented for detecting possible defects, like for example checking the correct positioning of the tyres inside the checking station for the purposes of correctly moving the acquisition devices provided for detecting defects.

The Applicant has observed that, in order to satisfy such a requirement, it is important for the checking stations to be suitably optimized to improve the accuracy and robustness of the processing procedures of the acquired images, with modes that are compatible with an industrial production plant with high productivity.

The Applicant has perceived that the aforementioned requirements can be satisfied through a suitable arrangement of the checking station and, in particular, of an image acquisition apparatus, of an illumination system and of a background of the checking station.

More precisely, the Applicant has finally found that the aforementioned requirements can be satisfied by illuminating both at least one free outer side surface of the tyre (i.e. not resting on any support and facing the image acquisition apparatus), and the circumferentially surrounding area and by arranging the image acquisition apparatus, the illumination system and the background of the checking station so as to highlight, in a working image generated by the image(s) acquired by the checking station for a tyre to be checked, the portion of interest of the tyre with respect to the area surrounding it.

SUMMARY

In accordance with a first aspect thereof, the invention concerns a method for checking a tyre for vehicle wheels in a checking station.

Preferably, the checking station comprises a background with a support surface lying on a plane perpendicular to a reference axis.

Preferably, the checking station comprises an image acquisition apparatus to acquire at least one image of the tyre arranged with a first outer lateral surface in contact with said support surface and a second outer lateral surface facing said image acquisition apparatus.

Preferably, the checking station comprises an illumination system.

Preferably, the illumination system is configured to illuminate said tyre, illuminating at least said second outer lateral surface of the tyre and an area circumferentially surrounding said tyre, said circumferentially surrounding area corresponding to at least one part of said background, including at least one part of the support surface.

Preferably, the checking station comprises a computer adapted to generate a working image from said at least one acquired image of the tyre.

Preferably, it is provided to arrange the image acquisition apparatus, the illumination system and the background such as to generate a contrast, in said working image, between at least the entire second outer lateral surface of the tyre and an area circumferentially surrounding said tyre, said circumferentially surrounding area corresponding to at least one part of the background, including at least one part of the support surface.

Preferably, it is provided to feed the tyre to the checking station with the first outer lateral surface in contact with said support surface, in a predefined position on said support surface.

Preferably, it is provided to acquire, with said image acquisition apparatus, said at least one image of the tyre.

Preferably, during said acquisition, it is provided to illuminate said tyre with said illumination system, illuminating at least said second outer lateral surface of the tyre and said circumferentially surrounding area.

Preferably, with said computer it is provided to generate, from said at least one acquired image of the tyre, said working image comprising said second outer lateral surface of the tyre and said circumferentially surrounding area.

Preferably, it is provided to process, with said computer, said working image, to carry out at least one checking procedure of the tyre wherein said second outer lateral surface of the tyre is distinguished from the circumferentially surrounding area by means of said contrast.

In accordance with a second aspect thereof, the invention concerns a checking station for checking a tyre for vehicle wheels.

Preferably, a background is provided comprising a support surface for the tyre.

Preferably, said support surface lies on a plane perpendicular to a reference axis.

Preferably, an image acquisition apparatus is provided that is configured to acquire at least one image of the tyre arranged with a first outer lateral surface in contact with said support surface and a second outer lateral surface of the tyre facing said image acquisition apparatus.

Preferably, an illumination system is provided that is configured to illuminate said tyre.

Preferably, the illumination system is configured to illuminate at least said second outer lateral surface of the tyre and an area circumferentially surrounding said tyre.

Preferably, said circumferentially surrounding area corresponds to at least one part of said background, including at least one part of the support surface.

Preferably, a computer is provided that is adapted to generate a working image from said at least one acquired image of the tyre.

Preferably, said working image comprises the second outer lateral surface of the tyre and the circumferentially surrounding area.

Preferably, the image acquisition apparatus, the illumination system and the background are configured such as to generate a contrast, in said working image, between at least the entire second outer lateral surface of the tyre and said circumferentially surrounding area.

The Applicant considers that the method and the checking station according to the invention, by illuminating both the free outer side surface of the tyre and the circumferentially surrounding area with a checking station configured to create a contrast between the surface of the tyre and the surrounding area, make it possible, on the one hand, to accurately illuminate the surface of interest of the tyre and, on the other hand, to highlight, in a working image generated by the images acquired with the image acquisition apparatus and the illumination system, the surface of the tyre with respect to the area surrounding it.

This makes it possible to reduce the possibility of zones of the surrounding area are confused with the dark surface of the tyre (for example, in the case of a support surface of the tyre originally of dark colour or darkened over time due to dirt) and to optimize, during the processing of the acquired images, the isolation of the surface of the tyre from the surrounding area. In this way, the possibility of errors is reduced, increasing the accuracy and robustness of the image processing procedures carried out by the checking station. Moreover, the improvement of the accuracy and robustness of the image processing procedures is obtained with modes compatible with high productivity industrial production. Indeed, the configuration of the checking station can be done one-time, in an installation step of the checking station, without impacting on the checking cycle time. In addition, such configuration, not requiring the alteration of the surface of the tyre, as illustrated in EP 2 141 476, does not preclude the possibility of carrying out checks adapted for detecting possible external defects on the outer and inner surface of the tyre and/or inside the structure thereof.

The present invention in at least one of the aforementioned aspects can have at least one of the following preferred characteristics.

Preferably, said working image comprises said at least the entire second outer lateral surface of the tyre.

Preferably, in said at least one checking procedure of the tyre, said at least the entire second outer lateral surface of the tyre is distinguished from the circumferentially surrounding area by means of said contrast.

Preferably, the contrast is obtained in terms of colour or grey level among pixels, in said working image, which correspond to said at least the entire second outer lateral surface of the tyre and pixels, in said working image, which correspond to said circumferentially surrounding area.

Preferably, the arrangement of the image acquisition apparatus, of the illumination system and of the background is carried out so that the pixels, in said working image, which correspond to said circumferentially surrounding area have a level of grey (in the case of a black and white image acquisition apparatus) or a colour (in the case of a colour image acquisition apparatus) which is in contrast with the level of grey or the colour of the pixels, in said working image, which correspond to said at least the entire second outer lateral surface of the tyre. This is preferably obtained without intervening on the outer surface of the tyre.

Preferably, the contrast of level of grey is such that the pixels, of said working image, which correspond to said at least the entire second outer lateral surface of the tyre have a level of grey below a first threshold and the pixels, of said working image, which correspond to said circumferentially surrounding area have a level of grey above a second threshold, said first threshold being less than or equal to, preferably less than, said second threshold.

Preferably, the illumination of the tyre is carried out by illuminating, in a single step or in multiple successive illumination steps, at least the entire second outer lateral surface of the tyre according to an angularly uniform illumination with respect to said reference axis.

Preferably, it is provided to feed the checking station with a plurality of tyres, one after another, according to a predetermined checking cycle, and to repeat the activities of acquiring, illuminating and generating a working image and processing it for all of the tyres.

Advantageously, the arrangement of the image acquisition apparatus, of the illumination system and of the background is carried out only once, for example in the installation step of the checking station, before starting the feeding of the tyres.

Preferably, the acquisition of said at least one image of the tyre and the illumination of the tyre are carried out with the tyre stationary.

Preferably, the image acquisition apparatus is arranged with a colour camera.

Preferably, in the case of colour contrast, said at least one part of background to which said circumferentially surrounding area corresponds is arranged in at least one colour (for example red or green) different (and, preferably, easily distinguishable) from black and grey. This makes it possible, in a colour acquisition system, to highlight the black (or dark grey) surface of the tyre from the circumferentially surrounding area that is coloured.

Preferably, the image acquisition apparatus is arranged with a black and white camera.

Preferably, in the case of grey level contrast, the illumination system is arranged with a first illumination assembly, adapted to illuminate said at least the second outer lateral surface of the tyre according to an angularly uniform illumination, and a second illumination assembly adapted to illuminate said circumferentially surrounding area. In this case, in which the acquired images are in black and white, the surface of the tyre could be confused with the surrounding area, for example in the case of a support surface of dark colour or darkened due to dirt. The use of two distinct illumination assemblies, one to illuminate at least the free outer side surface of the tyre and the other to illuminate the surrounding area, makes it possible, on the one hand, to accurately and in particular, angularly uniformly, illuminate the surface of interest of the tyre and, on the other hand, to obtain a clear contrast between the surface of the tyre and the surrounding area, highlighting, in the working image, the surface of the tyre with respect to the area surrounding it.

Preferably, the illumination of the tyre with said illumination system comprises the simultaneous illumination of the at least the second outer lateral surface of the tyre with said first illumination assembly and the illumination of the circumferentially surrounding area with said second illumination assembly.

Preferably, the illumination of the tyre with said illumination system comprises the illumination of the at least the second outer lateral surface of the tyre with said first illumination assembly and the illumination of the circumferentially surrounding area with said second illumination assembly, said illumination of the at least the second outer lateral surface of the tyre and said illumination of the circumferentially surrounding area being carried out in sequence, one after another.

More preferably, the acquisition, with said image acquisition apparatus, of said at least one image of the tyre, comprises the acquisition of at least one image during the illumination of the at least the second outer lateral surface of the tyre and the acquisition of at least one image during the illumination of the circumferentially surrounding area. This advantageously makes it possible, in the generation of said working image from the acquired images, to variably weight the images acquired during the two illuminations, according to different situations and requirements, so as to make the processing more flexible. Moreover, as explained in more detail hereinafter, this makes it possible to process the images acquired during the sole illumination of the surrounding area independently and such as to increase and make uniform the light intensity of the surrounding area, for example making the pixels relative to the surrounding area selectively white by the application of suitable filters. In this way, the light intensity of the surrounding area is increased and made uniform without the need to use powerful and therefore expensive illumination devices and/or high acquisition times.

Preferably, in the generation of said working image, said at least one image acquired during the illumination of the circumferentially surrounding area is subjected to a filtering operation adapted to increase and make uniform the grey level of the pixels of said at least one image that are relative to the circumferentially surrounding area. As stated above, this advantageously makes it possible to increase and make uniform the light intensity of the surrounding area, for example making the pixels relative to the surrounding area white by means of the application of suitable filters and, therefore, to increase the contrast with the dark surface of the tyre, without the need to use powerful and therefore expensive illumination devices and/or high acquisition times.

Preferably, the first illumination assembly comprises a plurality of illumination devices, the illumination of the at least the second outer lateral surface of the tyre being carried out by activating all of the illumination devices of said plurality, or sub-groups thereof, in sequence.

Preferably, the acquisition, with said image acquisition apparatus, of said at least one image of the tyre, comprises the acquisition of at least one image during each activation of said illumination devices of said first illumination assembly. This advantageously makes it possible, in the generation of said working image from the acquired images, to variably weight the images acquired during the various sequential illuminations, according to different situations ad requirements, so as to make the processing more flexible.

Preferably, the generation of said working image comprises the combination of the images acquired during the sequential illumination of the at least the second outer lateral surface of the tyre and of the circumferentially surrounding area.

Preferably, said at least one checking procedure of the tyre comprises a procedure for identifying the rotation axis of the tyre. The Applicant considers that the invention, by improving the contrast between the surface of the tyre and the surrounding area, makes it possible to increase the accuracy and the robustness of the identification procedure of the position of the rotation axis of the tyre. Such a procedure can be useful in a centering procedure adapted to align the rotation axis of the tyre with the reference axis of the checking station. For example, in the checking stations of the type illustrated in WO2016/088040, in which the tyre is fed on a rotating table, such a centering procedure can be carried out to align the rotation axis of the tyre with the rotation axis of such a rotating table (coinciding with the reference axis of the checking station).

Preferably, said at least one checking procedure of the tyre comprises a centering operation adapted to align the rotation axis of the tyre, identified with said identification procedure, with said reference axis.

Preferably, the centering operation comprises the detection of a deviation, on the plane of the support surface, between the reference axis and the rotation axis of the tyre and, in the presence of said deviation, the movement of the tyre on said plane, with respect to the reference axis, until the rotation axis of the tyre is substantially aligned with the reference axis.

Preferably, feeding the tyre in said predefined position on said support surface comprises a pre-centering operation, along a predetermined direction in the plane of said support surface, adapted to guarantee a deviation, along said predetermined direction, between the rotation axis of the tyre and the reference axis, less than or equal to a predetermined threshold (for example equal to 20-25 mm). Said pre-centering operation is preferably carried out before said centering operation.

Preferably, the support surface defines the support surface of a rotating table having rotation axis substantially coinciding with the reference axis.

More preferably, said at least one checking procedure of the tyre comprises a centering operation adapted to align the rotation axis of the tyre with said rotation axis of the rotating table.

Preferably, the centering procedure is carried out with a stationary rotating table and, after the centering operation, it is provided to rotate the rotating table together with the tyre around said rotation axis of the rotating table and to carry out further checking procedures on said tyre while the rotating table and the tyre are in rotation.

Preferably, the illumination of the at least the second outer lateral surface of the tyre with said first illumination assembly is carried out according to a symmetrical illumination with respect to the reference axis.

Preferably, the illumination of the at least the second outer lateral surface of the tyre with said first illumination assembly is carried out according to a scialytic illumination.

Preferably, the acquired images are digital.

Preferably, the acquired images are two-dimensional.

Preferably, the plane in which the support surface lies is substantially horizontal and the reference axis is substantially vertical.

Preferably, said illumination system is configured to illuminate, in a single step or in multiple successive illumination steps, at least the entire second outer lateral surface of the tyre according to an angularly uniform illumination with respect to said reference axis.

Preferably, the image acquisition apparatus comprises a colour camera.

Preferably, said at least one part of background to which said circumferentially surrounding area corresponds is made in at least one colour (for example red, green or white) different (and, preferably, easily distinguishable) from black and grey. This makes it possible, in a colour acquisition system, to clearly highlight the black or in any case dark surface of the tyre from the circumferentially surrounding area that is coloured.

Preferably, the image acquisition apparatus comprises a black and white camera.

Preferably, the illumination system comprises a first illumination assembly configured to illuminate said at least the second outer lateral surface of the tyre according to an angularly uniform illumination with respect to the reference axis and a second illumination assembly configured to illuminate said circumferentially surrounding area.

Preferably, the first illumination assembly is distinct from the second illumination assembly.

Preferably, the first illumination assembly is configured to illuminate at least the entire second outer lateral surface of the tyre for the entire circumference of the tyre with the tyre stationary.

Preferably, said circumferentially surrounding area is radially external to said outer surface of the tyre.

Preferably, the second illumination assembly is configured to illuminate said circumferentially surrounding area along the circumference of the tyre, with the tyre stationary.

Preferably, the first illumination assembly faces said support surface.

Preferably, the second illumination assembly faces said support surface.

Preferably, the first illumination assembly is adapted to illuminate according to a symmetrical illumination with respect to the reference axis.

Preferably, in a plane substantially perpendicular to the reference axis, the first illumination assembly is arranged according to a circular shape, including any shape (for example polygonal) that can be circumscribed by or inscribed in a circle, centred with respect to the reference axis.

Preferably, the first illumination assembly comprises an illumination device that, at a predetermined distance from the support surface, extends in a plane substantially perpendicular to the reference axis according to a circular shape including any shape that can be circumscribed by or inscribed in a circle (for example a ring or polygonal shape), substantially centred on the reference axis.

Preferably, said illumination device has a greater dimension in the plane substantially perpendicular to the reference axis.

Preferably, the first illumination assembly comprises (in addition or alternatively to the aforementioned illumination device) a plurality of illumination devices arranged around the support surface and facing said support surface.

Preferably, the first illumination assembly comprises a plurality of illumination devices (in addition or alternatively to the aforementioned illumination device) configured to illuminate respective different portions, more preferably partially juxtaposed, of said at least the second outer lateral surface of the tyre.

Preferably, the first illumination assembly comprises a plurality of illumination devices (in addition or alternatively to the aforementioned illumination device) configured to illuminate said at least the second outer lateral surface of the tyre from different angles.

Preferably, the first illumination assembly comprises a plurality of illumination devices (in addition or alternatively to the aforementioned illumination device) configured to illuminate said at least the second outer lateral surface of the tyre according to a scialytic illumination.

Preferably, the first illumination assembly comprises a plurality of illumination devices (in addition or alternatively to the aforementioned illumination device) having a greater dimension along a direction parallel to the reference axis.

Preferably, the illumination devices of said plurality of the first illumination assembly are each formed by a strip of LEDs, neon or halogen lights.

Preferably, the illumination devices of said plurality of the first illumination assembly are symmetrically arranged with respect to the reference axis.

Preferably, the illumination devices of said plurality of the first illumination assembly are angularly equidistant with respect to the reference axis.

Preferably, the illumination devices of said plurality of the first illumination assembly are arranged at the vertices of a polygon (preferably regular) having a number of sides (preferably even) greater than or equal to 4.

Preferably, the second illumination assembly comprises illumination devices arranged around the support surface, configured to illuminate respective different portions, more preferably partially juxtaposed, of said circumferentially surrounding area.

Preferably, the illumination devices of said second illumination assembly face said support surface.

Preferably, the illumination devices of the second illumination assembly have a greater dimension along a direction perpendicular to the reference axis.

Preferably, the illumination devices of the second illumination assembly are each formed by a strip of LEDs, neon or halogen lights.

Preferably, the illumination devices of the second illumination assembly are arranged at the vertices of a polygon (preferably regular) having a number of sides (preferably even) greater than or equal to 3, preferably greater than or equal to 4. For example, the illumination devices of the second illumination assembly can be arranged at the vertices of a rectangle.

Preferably, such a rectangle has longer and shorter sides corresponding to longer and shorter sides of the support surface, also in this case rectangular.

Preferably, the second illumination assembly comprises screens associated with the illumination devices of the second illumination assembly, adapted to direct the light emitted by said illumination devices towards said circumferentially surrounding area. This advantageously makes it possible to confine the illumination of the second illumination assembly at the circumferentially surrounding area, excluding at least the second outer lateral surface of the tyre from a direct illumination by said second assembly.

Preferably, the image acquisition apparatus is a digital apparatus.

Preferably, the image acquisition apparatus is adapted for acquiring images of the tyre according to a side view.

Preferably, the image acquisition apparatus comprises a video camera facing the support surface of the checking station.

Preferably, the image acquisition apparatus is adapted for acquiring the images of the tyre with the tyre stationary (not rotating).

Preferably, the computer is configured to activate the first illumination assembly and the second illumination assembly in sequence, one after the other, during the acquisition of said at least one image of the tyre by the image acquisition apparatus.

Preferably, the computer is configured to carry out a centering operation, adapted to align the rotation axis of the tyre to the reference axis, by processing the generated working image.

Preferably, the computer is configured to process said working image so as to detect a deviation, on the plane of the support surface, between the reference axis and the rotation axis of the tyre.

Preferably, the checking station comprises at least one actuator operatively connected to the support surface to move said support surface according to two directions belonging to said plane.

Preferably, in the presence of said deviation, the computer is configured to drive said at least one actuator so as to move the support surface according to at least one of said two directions until the rotation axis of the tyre is substantially aligned with the reference axis.

Preferably, the image acquisition apparatus comprises an optical axis substantially coinciding with the reference axis.

Preferably, the checking station comprises a table rotating around a rotation axis substantially coinciding with said reference axis, said support surface being the support surface of said rotating table.

BRIEF DESCRIPTION OF THE DRAWINGS

Further characteristics and advantages of the present invention will become clearer from the following detailed description of some embodiments thereof, provided solely as non-limiting examples, said description being carried out with reference to the attached drawings, in which.

DETAILED DESCRIPTION

Figure 1:
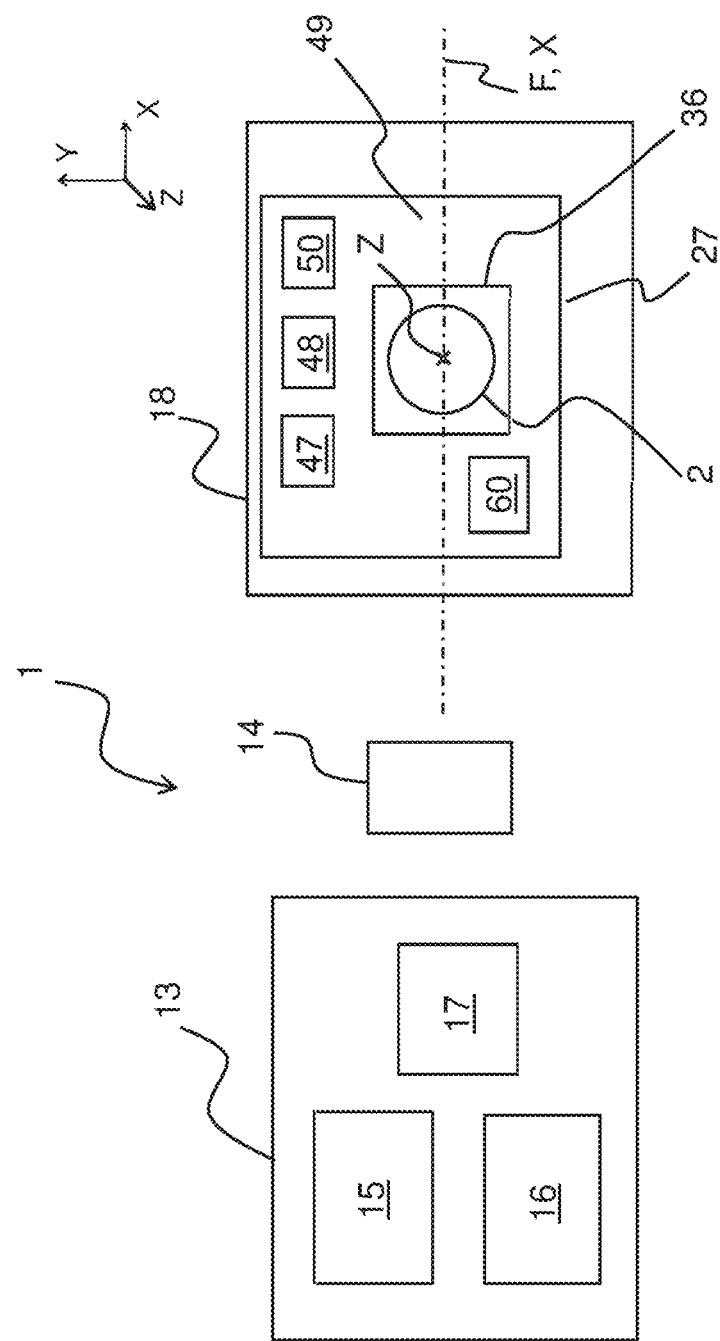
FIG. 1 schematically shows a plant for producing tyres for vehicle wheels.

A plant 1 for producing tyres 2 for vehicle wheels is illustrated in FIG. 1.

Figure 2:
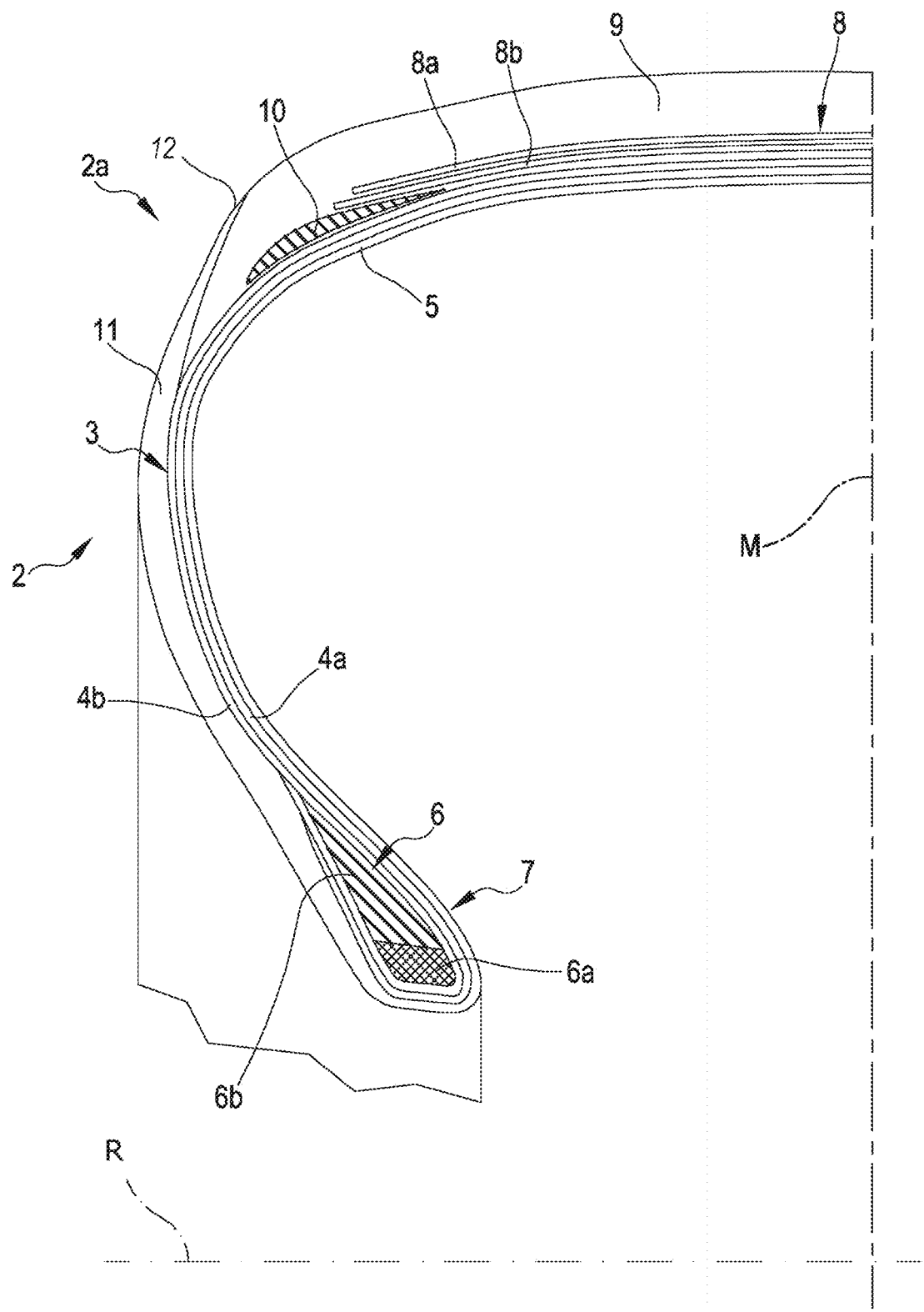
FIG. 2 shows a radial half-section of a tyre, in other words taken in a plane containing the rotation axis thereof.

The tyre 2 (FIG. 2) has a rotation axis R and an axial middle plane M, perpendicular to the rotation axis R (it should be specified that in FIG. 2 the position of the rotation axis R with respect to the section of the tyre 2 is shown in a totally indicative and schematic manner). The axial middle plane M divides the tyre 2 into a first axial half 2a and into a second axial half 2b. For the sake of simplicity of illustration, FIG. 2 shows only the first axial half 2a of the tyre 2, the other half 2b being substantially the mirror image (apart from the tread pattern that may not be symmetrical with respect to the aforementioned middle plane M).

The tyre 2 essentially comprises a carcass structure 3 having one or two carcass plies 4a, 4b. A layer of impermeable elastomeric material or so-called liner 5 is applied inside the carcass ply(-ies) 4a, 4b. Two annular anchoring structures 6 (only that of the axial half 2a is shown in FIG. 2) are engaged, in axially opposite positions (with respect to the middle plane M), at respective end edges of the carcass ply(-ies) 4a, 4b. The two annular anchoring structures 6 each comprise a so-called bead core 6a carrying an elastomeric filler 6b in radially outer position. The two annular anchoring structures 6 are integrated close to areas usually identified with the name "beads" 7 (only the one of the axial half 2a is shown in FIG. 2), at which the engagement between the tyre 2 and a respective mounting rim usually takes place. A belt structure 8 comprising belt layers 8a, 8b is circumferentially applied around the carcass ply(-ies) 4a, 4b, and a tread band 9 is circumferentially juxtaposed over the belt structure 8. The belt structure 8 can comprise a further so-called zero degrees layer (not illustrated) in a radially outer position with respect to the aforementioned layers 8a, 8b. The belt structure 8 can also be associated with so-called "sub-belt inserts" 10 each arranged between the carcass ply(-ies) 4a, 4b and one of the axially opposite end edges of the belt structure 8. Two sidewalls 11, each extending from the corresponding bead 7 to a corresponding side edge of the tread band 9, are applied in axially opposite positions (with respect to the middle plane M) on the carcass ply(-ies) 4a, 4b. The whole of the portion of each sidewall 11 close to the respective side edge of the tread band 9 and of each portion of the tread band 9 close to the respective sidewall 11 is known as shoulder 12 of the tyre 2.

With particular reference to FIG. 1, the plant 1 comprises a building line 13 of green tyres and a moulding and vulcanization line 14 operatively arranged downstream of the building line 13.

In the non-limiting embodiment of the plant 1 illustrated in FIG. 1, the building line 13 comprises a carcass structure building line 15, a crown structure building line 16, each crown structure comprising at least the belt structure 8, the tread band 9, possibly at least one part of the sidewalls 11, and a shaping and assembly station 17.

In the carcass structure building line 15, forming drums (not illustrated) are moved between different work stations (not illustrated) arranged to form, on each forming drum, the carcass structure 3 comprising the carcass ply(-ies) 4a, 4b, the liner 5, the annular anchoring structures 6 and possibly at least one part of the sidewalls 11.

At the same time, in the crown structure building line 16, one or more auxiliary drums (not illustrated) are moved in sequence between different work stations (not illustrated) arranged to form on each auxiliary drum a crown structure, comprising at least the belt structure 8, the tread band 9, and possibly at least one part of the sidewalls 11.

In the shaping and assembly station 17 the carcass structure 3, formed on its own forming drum in the carcass structure building line 15, is shaped toroidally and assembled at the crown structure, formed in the crown structure building line 16.

In other embodiments of the plant 1, not illustrated, the building line 13 can be of a different type, for example arranged to form all of the aforementioned components on a single forming drum.

The green tyres built by the building line 13 are transferred to the moulding and vulcanization line 14 comprising one or more vulcanizers.

From the moulding and vulcanization line 14 the finished tyres 2 come out in sequence one after the other with a predetermined cadence and a corresponding predetermined production cycle time.

Downstream of the moulding and vulcanization line 14, the plant 1 comprises an apparatus 18 configured to carry out the checking of the tyres 2 after moulding and vulcanization.

In an additional or alternative embodiment (not illustrated), the plant 1 can comprise a same apparatus 18, arranged between the building line 13 and the moulding and vulcanization line 14, configured to carry out the checking of the green tyres before the moulding and vulcanization step.

The apparatus 18 for checking tyres comprises at least one checking station 27 where the tyres 2 are subjected to quality controls in order to verify the possible presence of defects according to modes that will be described hereinafter. It should be observed that, for the sake of simplicity of illustration, FIG. 1 shows a single checking station 27 even if the apparatus 18 preferably comprises multiple checking stations 27.

The tyres 2 to be checked enter one after the other in sequence into the apparatus 18 and cross the checking stations 27 in sequence along a substantially rectilinear advancing direction F.

Each checking station 27 comprises a background 49 and a computer 48.

The background 49 comprises the space inside the checking station 27 outside of the tyre 2 to be checked. The background 49 comprises a support surface 36 configured to receive and support a first side surface (comprising one of the two sidewalls 11 with respective bead 7 and shoulder 12) of the tyre 2 to be checked, upwardly exposing a second outer lateral surface 21 thereof (in other words the other sidewall 11 of the tyre 2 with respective bead 7 and shoulder 12). The background 49 can also comprise the floor and a support structure 28 (shown schematically in FIGS. 4-8) of the checking station 27.

The support surface 36 lies on a substantially horizontal plane that is perpendicular to a vertical reference axis Z.

The background 49 comprises tools 60 like, for example, one or more anthropomorphous robotized arms (not shown) mounted above the support surface 36, each adapted for supporting one or more checking devices (not shown). The anthropomorphous robotized arms define support and movement devices of the checking devices. The checking devices are for example capable of carrying out a number of non-destructive checking operations that make it possible to detect possible external defects (on the outer and/or inner surface of the tyre 2) and/or internal defects with respect to the structure of the tyre 2. Said checks can, for example, be of the optical type (photography, shearography, holography, radiography, etc.), ultrasonic type, mechanical type or a combination thereof. As a non-exhaustive example, the checking devices can comprise digital video cameras with possible light sources using diffused, grazing or direct light, for example of the laser or LED type, configured to capture two-dimensional and/or three-dimensional images of the outer and/or inner surface of the tyres 2.

As well as the aforementioned checking devices supported and moved by the robotized arms, the background 49 comprises an image acquisition apparatus 47 and an illumination system 50 positioned in fixed positions (not mobile).

The image acquisition apparatus 47 comprises a digital video camera. The video camera can be in colour or black and white. The video camera can be a 2D digital video camera.

As shown in FIGS. 4-8, the video camera is positioned above the support surface 36, at a certain distance from it, with the lens facing downwards (in other words towards the tyre 2 placed on the support surface 36). Thanks to a suitable calibration procedure, the video camera has optical axis substantially coinciding with the vertical reference axis Z of the checking station 27.

The illumination system 50 is configured to suitably illuminate at least the second outer lateral surface 21 of the tyre 2 to be checked, which is exposed upwards (in other words towards the video camera). The illumination system 50 is configured to also suitably illuminate an area 22 surrounding the tyre 2, corresponding to a part of the background 49 that comprises at least part of the support surface 36 (and possibly part of the floor and/or of the support structure 28 of the support surface 36 and/or of the tools 60 of the background 49).

As explained in greater detail hereinafter, the tyre 2 is subjected to checks by acquiring images thereof and processing the acquired images. Depending on the checks to be carried out, the images are acquired with the aforementioned tools 60 (and in particular the robotized arms and the relative checking devices) or with the image acquisition apparatus 47 and the illumination system 50.

In particular, the checks can be carried out with the tyre 2 stationary, using the image acquisition apparatus 47 and the illumination system 50, or with the tyre in rotation (for example on a rotating table 35 like in the embodiment illustrated hereinafter with reference to FIG. 3), using the aforementioned robotized arms with the relative checking devices.

The computer 48 is operatively connected to the aforementioned tools 60, to the image acquisition apparatus 47 and to the illumination system 50 to manage the acquisition of images of the tyre 2, stationary or in rotation, and the illumination thereof during such acquisitions. The computer 48 is also adapted for suitably processing the acquired image(s), implementing suitable checking algorithms.

The computer 48 can be located at the checking station 27 or, at least in part, in a remote station.

Figure 3:
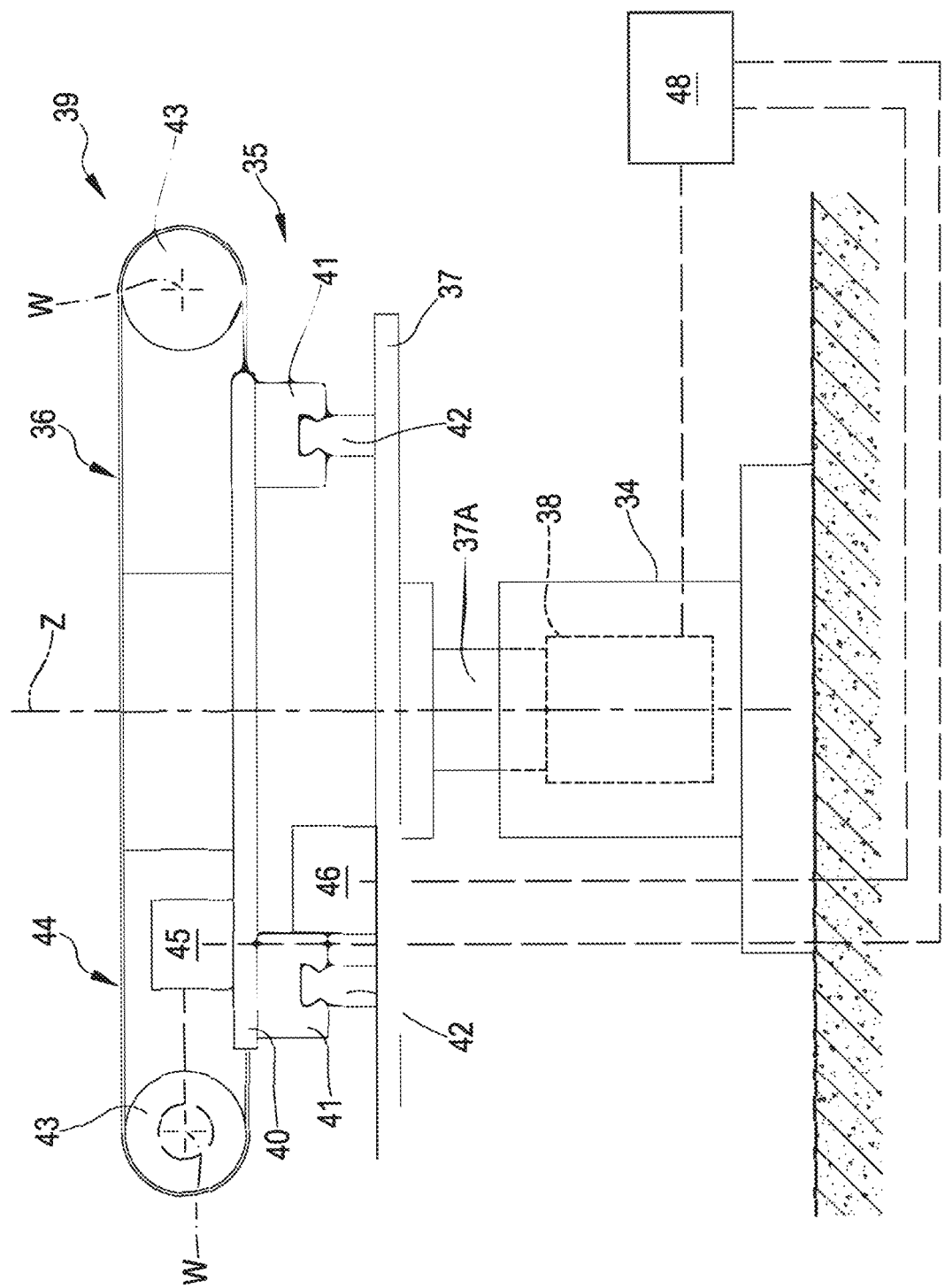
FIG. 3 schematically shows some elements of a checking station belonging to the plant of FIG. 1.
Figure 4:
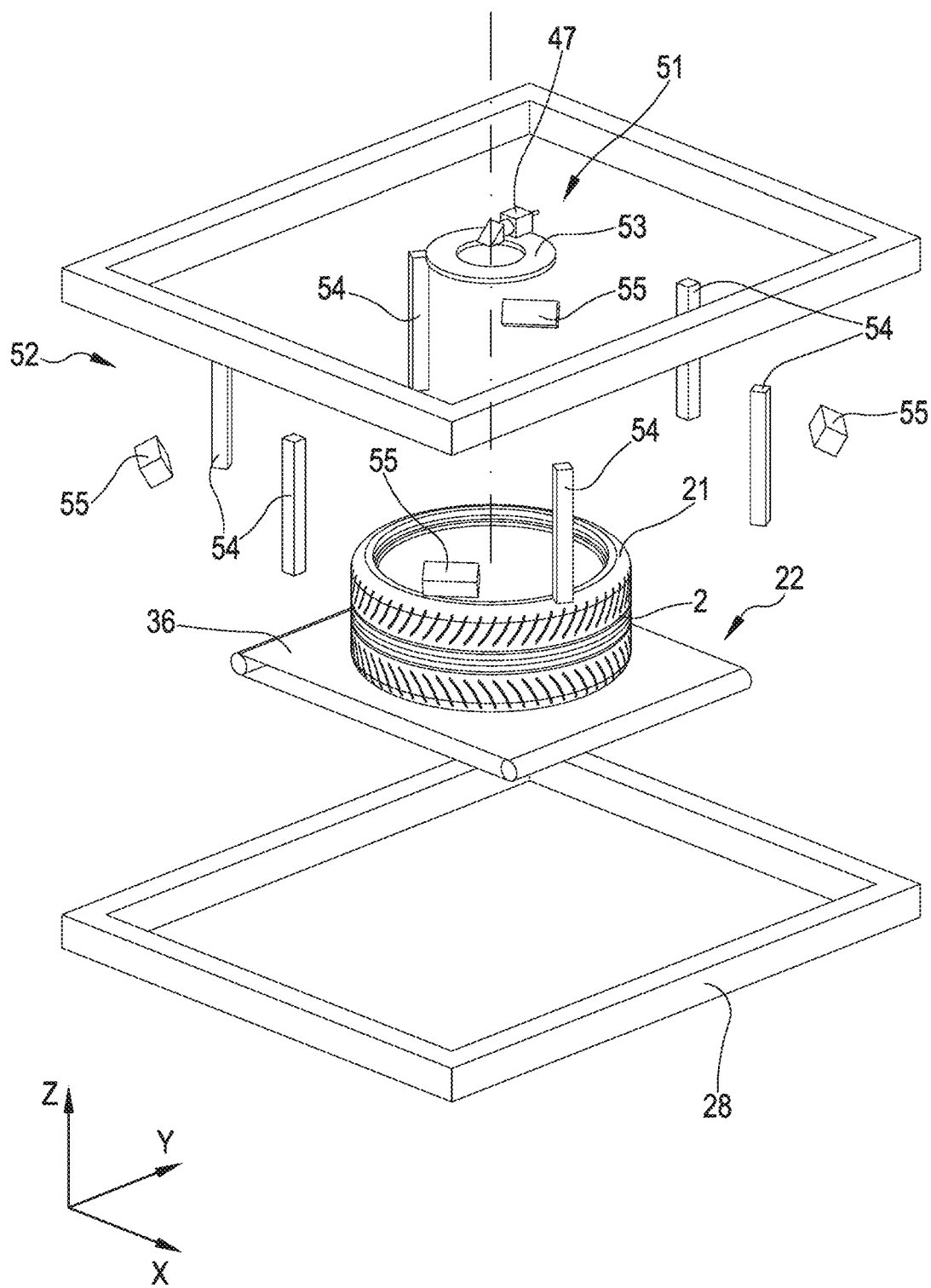
FIG. 4 shows a perspective view of other elements of the checking station of FIG. 3, comprising an illumination system, an image acquisition apparatus and a support surface for a tyre.
Figure 6:
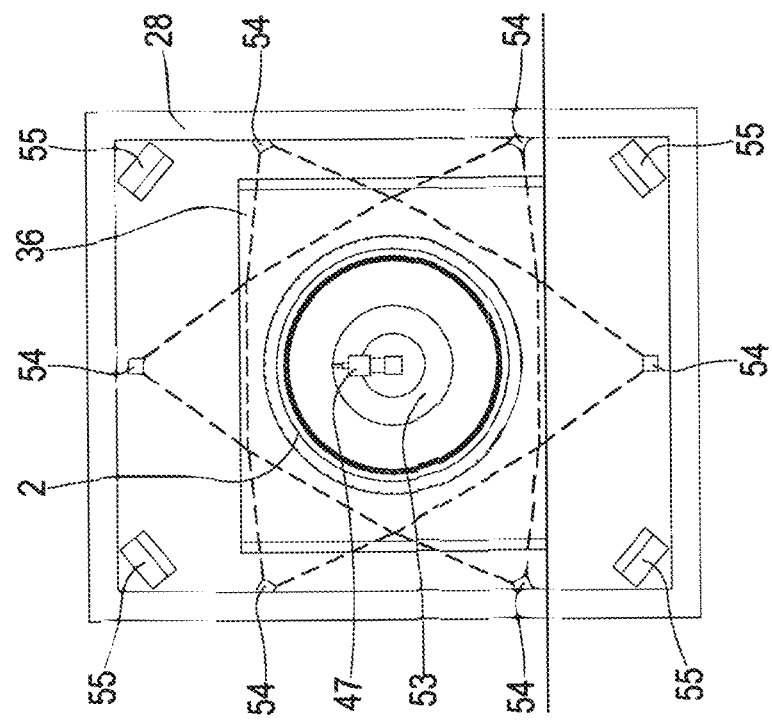
FIG. 6 is a top view of FIG. 5.

In a preferred embodiment, shown in FIG. 3, each checking station 27 comprises a table 35 rotating around a rotation axis coinciding with the vertical reference axis Z of the checking station 27. The rotating table 35 is mounted on a base block 34, resting on the ground, so as to be able to rotate around the vertical reference axis Z. In this embodiment, the support surface 36 of the checking station 27 is defined by a supporting portion of the rotating table 35.

In the illustrated embodiment, the rotating table 35 comprises a rotating support 37 arranged above the base block 34 and rotatably coupled with the base block 34 around said vertical reference axis Z. The rotating support 37 is fixedly connected to a shaft 37A coming out from the base block 34. The shaft 37A is connected to a movement device 38 (schematically illustrated in FIG. 3) installed in the base block 34 and configured to rotate the rotating table 35 around said vertical reference axis Z. The vertical reference axis Z is fixed (not mobile) with respect to the base block 34 and with respect to the ground.

An endless conveyor 39 is mounted on the rotating support 37. In particular, the endless conveyor 39 comprises a slide 40 defined by a plate provided, on a lower face thereof, with a pair of sliding blocks 41. Each of the sliding blocks 41 is slidably engaged with a respective guide 42 mounted on an upper face of the rotating support 37.

The slide 40 carries, on an upper face thereof, a pair of rollers 43 hinged on brackets, not illustrated and fixedly connected to the slide 40. The rollers 43 are mobile in rotation around respective axes of revolution W parallel to each other and parallel to the guides 42. A conveyor belt 44 is wound on the pair of rollers 43 to define a closed path. The conveyor belt 44 has an upper branch the upper surface of which defines said support surface 36 that therefore lies substantially in a horizontal plane.

A first actuator 45 (schematically illustrated in FIG. 3) is mounted on the slide 40 and is operatively connected to at least one of the two rollers of the pair 43 to set it in rotation and move the conveyor belt 44 along the closed path. The rollers 43 can be rotated in one direction of rotation or in the opposite direction of rotation to generate the translation of the upper branch and of the support surface 36 in a first direction X, both in one way and in the opposite way. The first direction X lies in the horizontal plane and is perpendicular to the axes of revolution W. With the rotating table 35 stationary in rest position, the first direction X is aligned with the advancing direction F.

A second actuator 46, illustrated schematically in FIG. 3, is mounted between the slide 40 and the rotating support 37 and is configured to move the slide 40 on the guides 42 along a second direction Y that in the horizontal plane is perpendicular to the first direction X and parallel to the axes of revolution W. The support surface 36 is therefore mobile in the horizontal plane according to said two directions X, Y with respect to the vertical reference axis Z that, on the other hand, is fixed with respect to said support surface 36. The movement of the support surface 36 along the first direction X can be continuous and endless. The movement of the support surface 36 along the second direction Y is limited by the available stroke provided by the system consisting of the sliding blocks 41 and the guides 42.

In a different embodiment, not illustrated, instead of the conveyor belt 44, the endless conveyor 39 can comprise a plurality of motorized rollers parallel to each other and mounted on the rotating support 37. In this case, the whole of the upper surfaces of said motorized rollers defines said support surface 36.

The computer 48 is operatively connected to the movement device 38, to the first actuator 45 and to the second actuator 46.

In a preferred embodiment, the computer 48 is configured to implement a centering operation adapted to align the rotation axis R of the tyre 2 with the vertical reference axis Z of the checking station 27.

In the case of the embodiment of FIG. 3, in which the vertical reference axis Z coincides with the rotation axis of the rotating table 35, the computer 48 is preferably configured to define the position of the rotation axis R of the tyre 2 arranged on the support surface 36 and detect a deviation S between the vertical rotation axis of the rotating table 35 and the rotation axis R of the tyre 2 and to drive the first and the second actuator 45, 46 so as to move the support surface 36 according to the first X and/or second direction Y as a function of the detected deviation S, until the rotation axis of the tyre R is aligned with the vertical rotation axis of the rotating table 35.

The alignment is such as to make the detected deviation S less than a predetermined value, for example equal to or less than about 0.1 mm.

In a preferred embodiment (not illustrated), the apparatus 18 for checking tyres preferably also comprises, upstream of the checking station(s) 27, a mechanical centering support comprising a roller unit on which the tyre 2 is positioned before feeding it to the first station of the checking stations 27. Such a mechanical centering support is configured to carry out a pre-centering operation of the tyre 2 with respect to the vertical reference axis Z, adapted for obtaining a deviation Sy along the second direction Y, between the vertical reference axis Z and the rotation axis R of the tyre 2, below a predetermined threshold, for example equal to 20-25 mm (pre-centering along the second direction Y).

The pre-centering operation can be carried out both in the case of a generic support surface 36 (including a fixed, non-mobile support surface) and in the case of a mobile support surface, as shown, for example, in the embodiment illustrated in FIG. 3, where the vertical reference axis Z coincides with the vertical rotation axis of the rotating table 35.

With reference to a preferred embodiment, illustrated in FIGS. 4-8, the image acquisition apparatus 47 is a black and white digital video camera 2D. It is positioned above the support surface 36 with optical axis coinciding with the vertical reference axis Z of the checking station 27. For example, it is arranged at a distance from the support surface 36 of about 1160 mm, has a sensor with diagonal dimension equal to ½ inch, a lens with focal length of 4.4 mm and a field of view of about 830 mm.

In turn, in the embodiment illustrated in FIGS. 4-8, the illumination system 50 comprises a first illumination assembly 51 and a second illumination assembly 52. The first illumination assembly 51 is configured to illuminate at least the second outer lateral surface 21 of the tyre 2, not in contact with the support surface 36. In turn, the second illumination assembly 52 is configured to illuminate an area 22 circumferentially surrounding the tyre 2. Preferably, the circumferentially surrounding area 22 is radially external with respect to the tyre 2.

It should be observed that this preferred embodiment, illustrated in FIGS. 4-8, applies both to the case of a generic support surface 36 (including a fixed, non-mobile support surface) and to the case of a mobile support surface, as shown for example in the embodiment of FIG. 3 (where the support surface is part of the rotating table 35 and the vertical reference axis Z coincides with the rotation axis of the rotating table 35).

Preferably, the first illumination assembly 51 comprises a circular illumination device 53 and a plurality of vertical illumination devices 54 (in other words with greater dimension along a vertical direction, parallel to the axis Z). In turn, the second illumination assembly 52 preferably comprises a plurality of horizontal illumination devices 55 (in other words with a greater dimension along a horizontal direction, perpendicular to the axis Z).

For example, the circular illumination device 53 is formed from a plurality of LEDs arranged circularly and the vertical illumination devices 54 and the horizontal illumination devices 55 are each formed from a strip of LEDs arranged linearly.

The circular illumination device 53 extends in a plane substantially perpendicular to the vertical reference axis Z (in other words in a plane substantially parallel to the support surface 36) according to a circular crown shape. The circular crown has a central hole centred with respect to the vertical reference axis Z at which the image acquisition apparatus 47 is located. The circular illumination device 53 is adapted to form a circular beam of light (not shown) adapted to ensure an angularly uniform illumination of the entire second outer lateral surface 21 of the tyre 2, for the entire circumference thereof (with the tyre 2 stationary). The circular illumination device 53 is positioned above the support surface 36, with the lower plane of the device arranged the greatest possible distance (compatibly with the spaced occupied by and the configuration of the support structure 28 of the support surface 36) from the support surface 36 (for example at a distance of at least 1000 mm-1100 mm).

Figure 5:
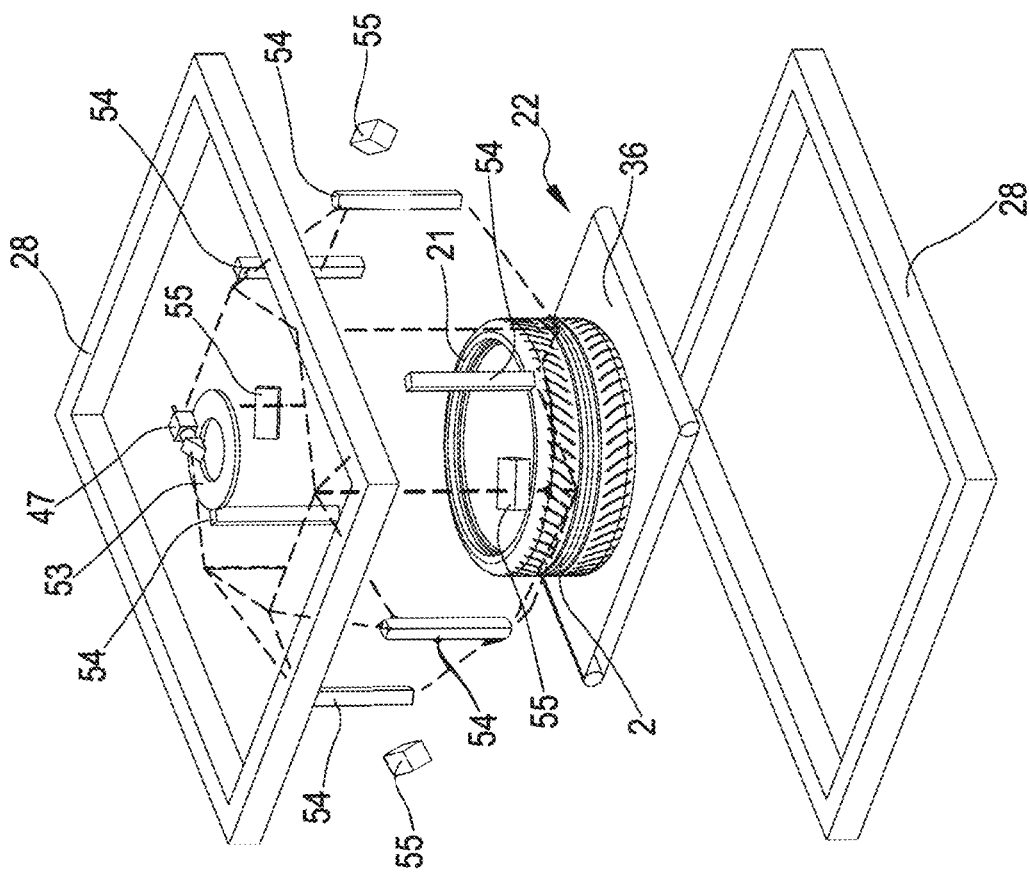
FIG. 5 schematically shows a perspective view of light beams emitted by vertical illumination devices of the illumination system of FIG. 4.
Figure 8:
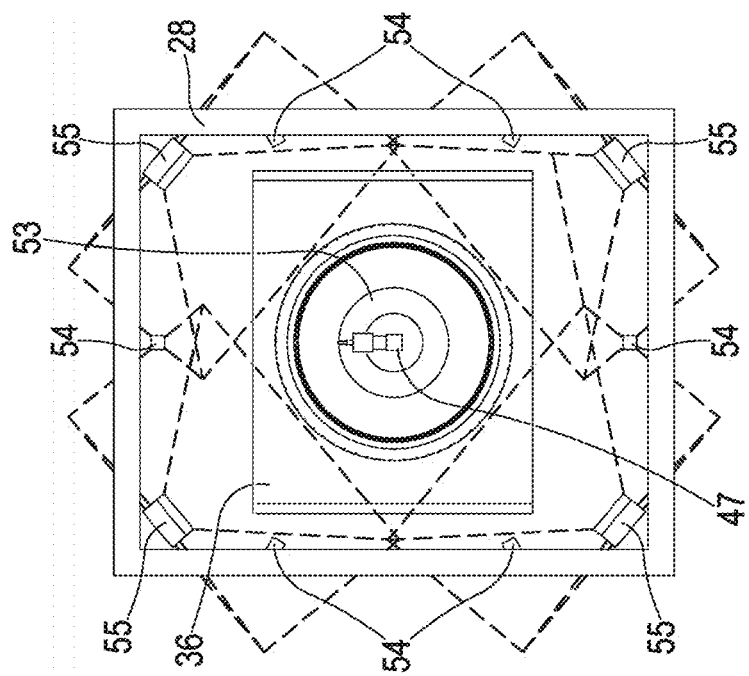
FIG. 8 is a top view of FIG. 7.
Figure 7:
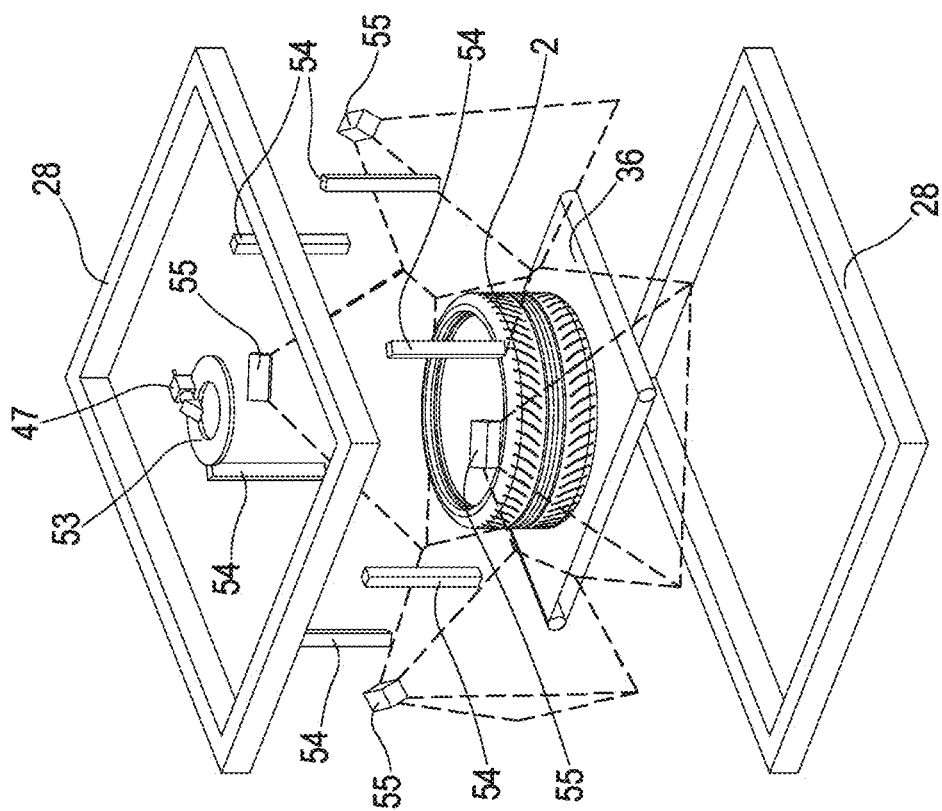
FIG. 7 schematically shows a perspective view of light beams emitted by horizontal illumination devices of the illumination system of FIG. 4.

The vertical illumination devices 54 are positioned around the support surface 36 so as to illuminate, as schematically illustrated in FIG. 5, respective different portions (preferably partially juxtaposed) of at least the second outer lateral surface 21 of the tyre 2. The vertical illumination devices 54 are positioned above the support surface 36, with their lower end arranged a certain distance from it (for example, about 550 mm), such as to allow the movement, and possibly the rotation, of the tyre 2.

Figure 9A:
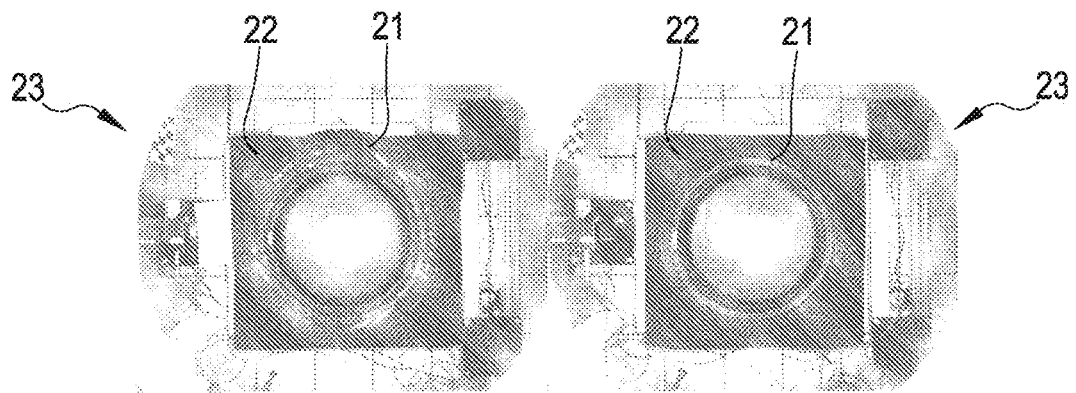
FIGS. 9a-9c' show examples of images acquired with the illumination system and the image acquisition apparatus of FIG. 4.
Figure 9B:
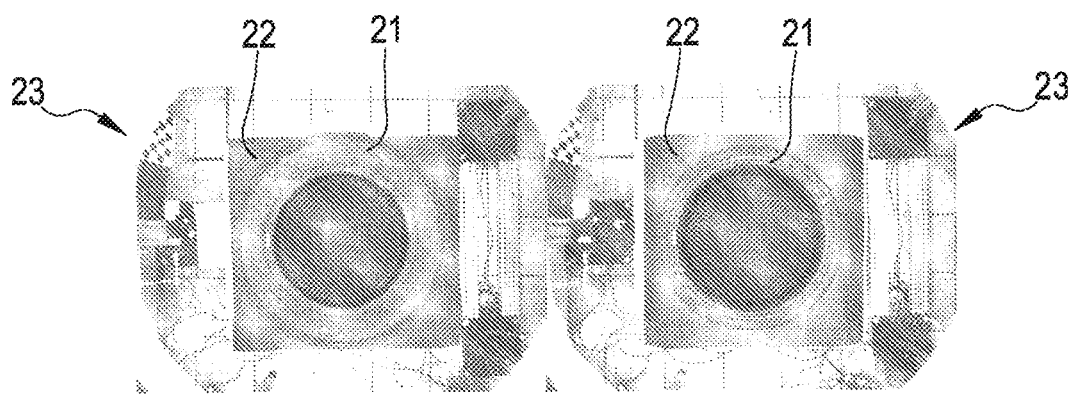
Figure 9C:
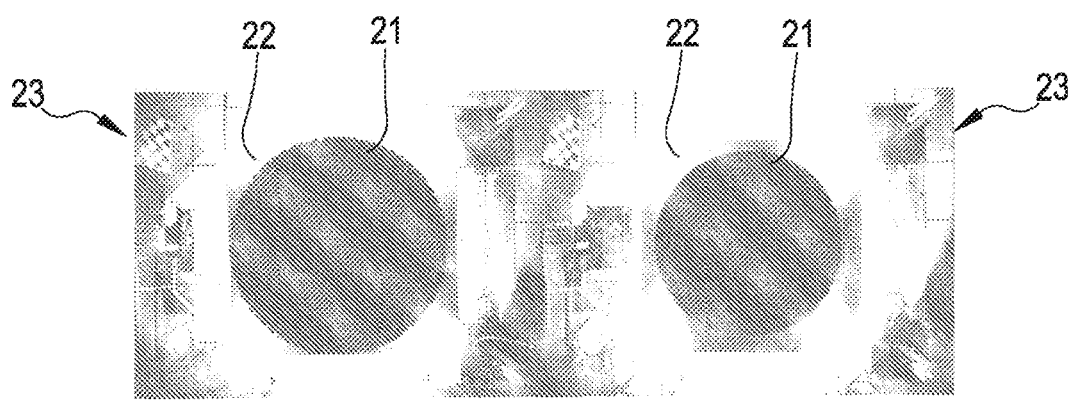

The verticality and the aforementioned positioning of the vertical illumination devices 54 advantageously makes it possible to illuminate the second outer lateral surface 21 of the tyre 2 from different angles according to a scialytic illumination. As illustrated in FIG. 9, this makes it possible to reduce, in the images acquired by the image acquisition apparatus 47, the presence of possible shadows caused, for example, by signs or drawings present on the outer side surface of the tyre 2. FIG. 9 shows, indeed, examples of images acquired for two different tyres (respectively shown on the left and on the right of FIG. 9) using only the circular illumination device 53 (FIGS. 9a) and 9a')), only the vertical illumination devices 54 (FIGS. 9b) and 9b')) and only the horizontal illumination devices 55 (FIGS. 9c) and 9c')). As can be seen from a comparison between the images of FIGS. 9a) and 9b), for the left tyre, the vertical illumination devices 54 make it possible to eliminate the shadows present in the image of FIG. 9a). For the right tyre, on the other hand, substantially the same results are obtained, in terms of elimination of shadows, by illuminating with only the circular illumination device 53 (FIG. 9a')) or with only the vertical illumination devices 54 (FIG. 9b')).

The use of both types of illumination (circular illumination device 53 and vertical illumination devices 54) therefore makes it possible to obtain satisfactory results both in terms of angular uniformity of illumination and in terms of reduction of presence of shadows, for any type and model of tyre 2, in particular even with section having width in a very wide range. In any case, the present invention also applies to the case in which the first illumination assembly 51 comprises either only the circular illumination device 53 or only the vertical illumination devices 54.

Preferably, in order to ensure an angularly uniform and symmetrical illumination, the vertical illumination devices 54 are arranged at the vertices of a substantially regular polygon having a number of sides equal to at least 4. For example, in the embodiment illustrated in FIGS. 4-8, the vertical illumination devices 54 are arranged at the vertices of a regular hexagon (see, in particular, FIG. 6).

The verticality of the vertical illumination devices 54, as well as the aforementioned advantages in terms of reduction of shadows, advantageously makes it possible to reduce the space occupied inside the checking station 27, already crammed with tools 60, and to limit the presence of screening and/or undesired light reflections by such tools 60 that can act as an obstacle to the propagation of the light emitted by such vertical illumination devices 54. However, instead of the vertical illumination devices 54, horizontal illumination devices could be used, which are advantageous for the purposes of obtaining an angularly uniform illumination.

In the embodiment illustrated in FIGS. 4-8, the horizontal illumination devices 55 are arranged at the vertices of a rectangle, said vertices substantially corresponding to the vertices of the support surface 36, also in this case rectangular. Alternatively, it is possible to use different embodiments like a square shape of the arrangement of the illumination devices 55 and of the support surface 36.

The horizontal illumination devices 55 are positioned above the support surface 36, a certain distance from it (for example equal to about 590-600 mm). The horizontal illumination devices 55 have optical axis pointed towards the support surface 36. For example, the optical axis of the horizontal illumination devices 55 forms an angle of about 45°-48° with the plane of the support surface 36.

Figure 11:
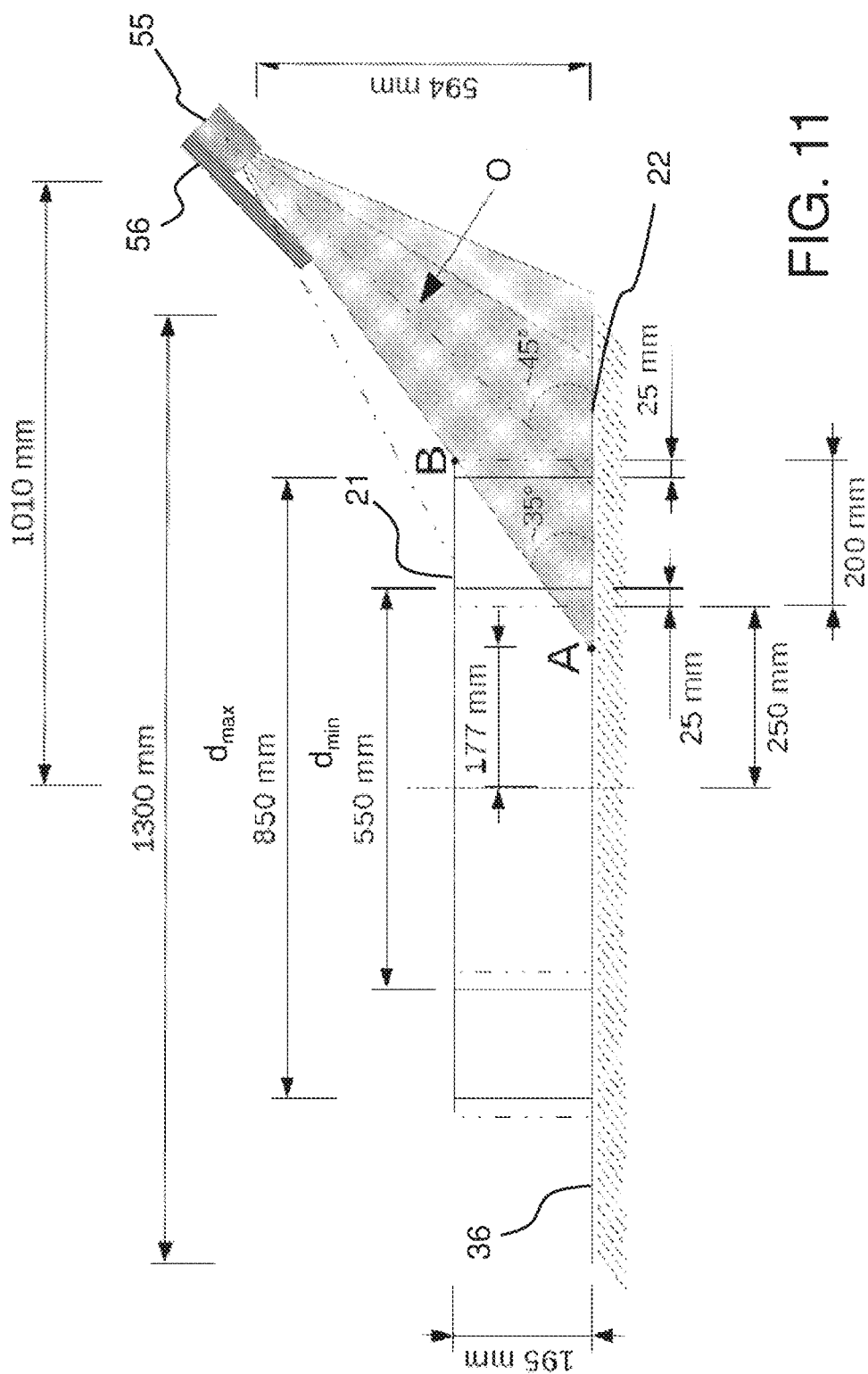

As schematically illustrated in FIG. 11, the second illumination assembly 52 preferably comprises screens 56 associated with the horizontal illumination devices 55, adapted for confining the light emitted by said horizontal illumination devices 55 to said circumferentially surrounding area 22. Preferably, the screens 56 have a greater dimension on a plane having an adjustable inclination with respect to the support surface 36

In particular, given a predefined range for the dimensions of the tyres 2 being checked, the horizontal illumination devices 55 and the screens 56 are configured, as a whole, so as to ensure:
  on the one hand, that the area 22 circumferentially surrounding the tyre 2 (in radially outer position with respect to the latter) is illuminated in the case of the tyre 2 of smaller dimensions (for example minimum diameter $d_{min}$ of 550 mm) inside said predetermined range, and
  on the other hand, that the second outer lateral surface 22 of the tyre is excluded from the illumination in the case of the tyre 2 of larger dimensions (for example maximum diameter $d_{max}$ of 850 mm) and smaller width of the section (for example equal to 195 mm), within said predetermined range.

In other words, for every model of tyre within said predetermined range, the second illumination assembly 52 and, in particular, the horizontal illumination devices 55 and the screens 56 are configured so as to create a shadow on the second outer lateral surface 21 of the tyre (and, possibly, on the upper part of the tread band 9) illuminating, on the other hand, the circumferentially surrounding area 22 and, possibly, the lower part of the tread band 9. As schematically illustrated in FIG. 11, the screens 56 are adapted for preventing rays of light coming from the horizontal illumination devices 55 from arriving directly beyond a point B, such a point B corresponding to the end of the second outer lateral surface 21 of the tyre 2 of greater diameter (within said predetermined range) and to a point A located on the support surface 36 a certain distance from the vertical reference axis Z. FIG. 11 shows an example with a minimum diameter $d_{min}$ of the tyre of 550 mm, a maximum diameter $d_{max}$ of the tyre of 850 mm, a width of the support surface 36 $di$ 1300 mm, a distance between the horizontal illumination devices 55 and the support surface 36 of 594 mm, an angle between the optical axis O of the horizontal illumination devices 55 and the support surface 36 of 45°, an angle between the light ray generated by each horizontal illumination device 55 tangent to the corresponding screen 56 and the support surface 36 of 35°, a distance between the horizontal illumination devices 55 and the vertical reference axis Z of 1010 mm, a width of the section of 195 mm and an initial deviation S of 25 mm, between the vertical reference axis Z and the rotation axis R of the tyre 2. In this example, the point A is located on the support surface 36 at a distance of 177 mm from the reference axis Z.

The computer 48 is operatively connected to the image acquisition apparatus 47 and to the illumination system 50 to manage the acquisition of images of the tyre 2, stationary on the support surface 36, and the illumination by the first illumination assembly 51 and the second illumination assembly 52.

Preferably, the computer 48 is such as to drive the image acquisition apparatus 47 so that it acquires an image (or more than one) with the circular illumination device 53, the vertical illumination devices 54 and the horizontal illumination devices 55 switched on simultaneously or according to predetermined time sequences.

As illustrated in FIG. 9, for example, the image acquisition apparatus 47 is adapted for acquiring firstly an image 23 with only the circular illumination device 53 switched on (see the images of FIGS. 9a and 9a'), then an image 23 with only the vertical illumination devices 54 switched on (see the images of FIGS. 9b and 9b') and, finally, an image 23 with only the horizontal illumination devices 55 switched on (see the images of FIGS. 9c and 9c'). Alternatively, it is possible to provide for acquiring many images with different combinations of only the vertical illumination devices 54 switched on and/or multiple images with different combinations of only the horizontal illumination devices 55 switched on (for example switching on two opposite illumination devices at a time).

The images 23 thus acquired are then combined by the computer 48 so as to obtain a working image 24 on which to apply the suitable checking algorithms.

Such a combination is preferably carried out by variably weighting the pixels of the images 23 acquired during the different illuminations, according to different situations and requirements. Moreover, it is preferably carried out by processing the images 23 acquired during only the illumination of the surrounding area 22 (see the images of FIGS. 9c and 9c') independently and such as to increase and make uniform the light intensity of the surrounding area 22.

In particular, the computer 48 is adapted for adding together the acquired images 23, weighting, with suitable weights, the image 23 obtained with only the circular illumination device 53 switched on, the image(s) 23 obtained with only the vertical illumination devices 54 switched on and the image(s) 23 obtained with only the horizontal illumination devices 55 switched on, suitably filtered. Preferably, the image(s) 23 obtained with only the horizontal illumination devices 55 switched on is/are filtered, for example using a non-linear sigmoid function, so as to make all of the pixels having a level of grey above a certain threshold white and the other pixels black. This advantageously makes it possible to increase and make uniform the light intensity of the surrounding area 22 without the need to use powerful (and therefore expensive) illumination devices and/or high acquisition times.

For example, the sum of the images can be schematically represented by the following formula:

$$I_w = w_c I_c = w_v I_v + f(I_h)$$

where $I_w$ represents the intensity of the pixels of the working image 24; $I_c$ represents the intensity of the pixels of the image 23 obtained with only the circular illumination device 53 switched on and we represents the weight used to weigh the pixels of such an image; $I_v$ represents the intensity of the pixels of the image(s) 23 obtained with only the vertical illumination devices 54 switched on and $w_v$ represents the weight used to weigh the pixels of such image(s); $I_h$ represents the intensity of the pixels of the image(s) 23 obtained with only the horizontal illumination devices 55 switched on and $f(I)$ is a non-linear sigmoid function where □ (which, for example, is equal to 30) controls the level of grey of the inflection point of the sigmoid function and □ (which, for example, is equal to 5) controls its slope $$f(I_h) = w_h \cdot \frac{1}{1 + e^{-\frac{(I-\beta)}{\sigma}}}$$

Since it concerns a black and white camera, the intensity I of the pixels is represented by levels or tones of grey that, in an 8 bit representation, vary from 0 (black) to 255 (white).

Moreover, it should be observed that every two-dimensional image is represented by a matrix of pixels having a certain number of rows and columns. The aforementioned symbols $I_w$, $I_c$, $I_v$ and $I_h$ therefore symbolically represent the intensity values of all of the pixels of such a matrix.

By acting on the two parameters $w_c$ and $w_v$ it is possible to vary the weights of the intensities $I_c$ and $I_v$ of the pixels according to different situations and requirements, so as to make obtaining the working image 24 more flexible.

Figure 10A:
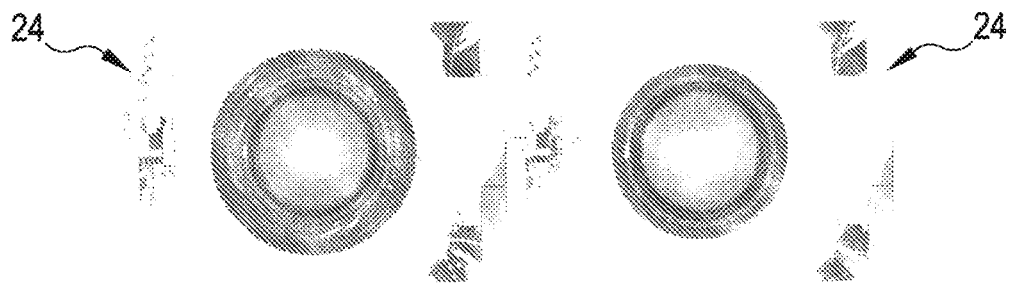
FIGS. 10a-10c' show examples of working images generated by processing the acquired images of FIG. 9, FIG. 11 schematically shows the deviation, by screens, of the light beams emitted by the horizontal illumination devices shown in FIG. 7.
Figure 10B:
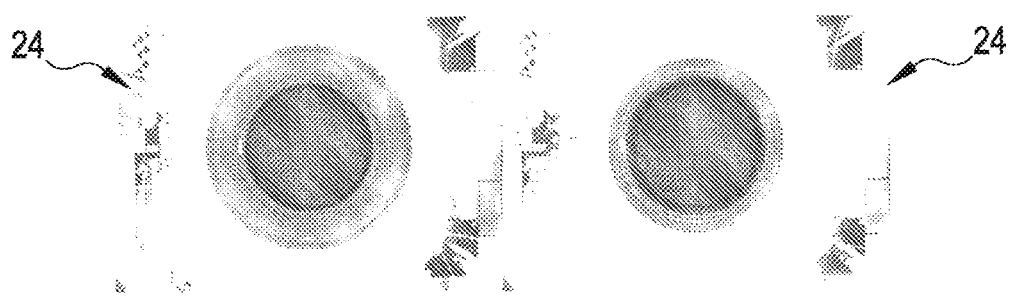
Figure 10C:
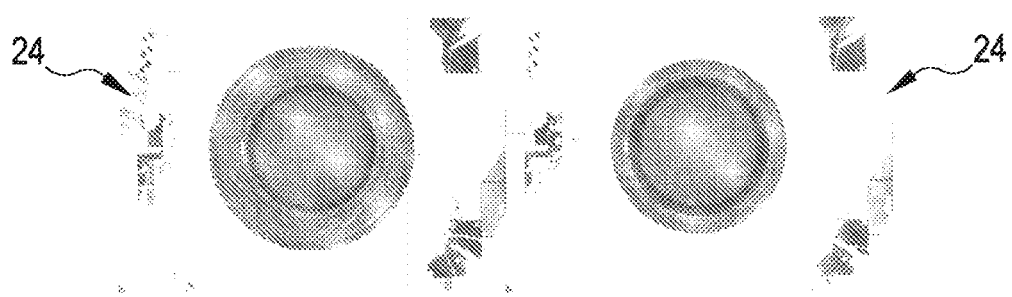

Examples of working images 24 obtained for the two tyres of FIG. 9 are shown in FIG. 10, where, in particular, FIGS. 10a and 10a' show the result of the sum $I_w = w_c I_c + f(I_h)$, FIGS. 10b and 10b' show the result of the sum $I_w = w_v I_v + f(I_h)$ and FIGS. 10c and 10c' show the result of the sum $I_w = w_c I_c + w_v I_v + f(I_h)$.

As can be seen, with respect to the acquired images 23 shown in FIG. 9, in the working images 24, the second outer lateral surface 21 of the two tyres (respectively represented on the left and right of the page) is clearly visible and distinct from the surrounding area 22 (which has been made white by the filtering function $f(I_h)$).

In the case of residual ambient light in the working image 24, it is possible to provide for acquiring a further image with all of the lights of the illumination system 50 switched off and subtracting the image thus acquired from the working image 24, so as to eliminate the disturbance of the ambient light.

The use of the two distinct illumination assemblies, the first 51 to illuminate at least the second outer lateral surface 21 of the tyre 2 and the second 52 to illuminate the circumferentially surrounding area 22, excluding at least the second outer lateral surface 21, makes it possible, on the one hand, to accurately illuminate (and, in particular, in an angularly uniform and symmetrical manner) the surface of interest of the tyre 2 and, on the other hand, to obtain a clear contrast between the surface of the tyre 2 and the surrounding area 22, highlighting, in the working images 24, the surface of the tyre 2 with respect to the surrounding area 22 itself. This makes it possible to reduce the possibility of dark zones of the surrounding area 22 being confused with the black surface of the tyre 2 (for example in the case of support surface 36 of the tyre 2 of dark colour or darkened over time due to dirt) and to optimise—during the processing of the working images 24—the isolation of the surface of the tyre 2 from the surrounding area 22. In this way, the possibility of errors is reduced, increasing the accuracy and robustness of the processing procedures carried out by the computer 48 on the working images 24.

It should be observed that the embodiment illustrated with reference to FIGS. 4-8 makes it possible to obtain the aforementioned technical effects using, in the image acquisition apparatus 47, a black and white camera and by arranging the image acquisition apparatus 47, the illumination system 50 and the background 49 so as to obtain a contrast of grey level, in the working image 24, between the second outer lateral surface 21 of the tyre 2 and the area 22 circumferentially surrounding the tyre 2, in radially external position to it.

In the case of use of a colour camera (instead of black and white), the aforementioned technical effects can be obtained by arranging the image acquisition apparatus 47, the illumination system 50 and the background 49 so as to obtain a colour contrast, in the working image 24, between the second outer lateral surface 21 of the tyre 2 and the area 22 circumferentially surrounding the tyre 2, in a radially external position to it. In particular, the colour contrast is obtained by making the part of background 49 to which the circumferentially surrounding area 22 corresponds in at least one colour different from black and from the different tones of grey. This makes it possible to highlight the black or dark/dark grey surface of the tyre 2 from the circumferentially surrounding area 22 that is coloured, for example green, red or even white.

In any case, the working image 24 obtained as described above is then processed by the computer 48 to carry out at least one checking procedure of the tyre 2 in which the entire second outer lateral surface 21 of the tyre 2 is distinguished from the circumferentially surrounding area 22.

For example, the Applicant considers that the present invention, improving the contrast between the surface of the tyre 2 and the surrounding area 22, makes it possible to increase the accuracy and the robustness of a procedure adapted to estimate the position of the rotation axis R of the tyre 2. In particular, ensuring an angularly uniform and symmetrical illumination system, the present invention makes it possible to increase the accuracy and the robustness of a procedure for estimating the position of the rotation axis R of the tyre 2 that is based on the angular symmetry of the tyre 2.

Such an estimation can be useful in the aforementioned centering operation adapted to align the rotation axis R of the tyre 2 to the vertical reference axis Z of the checking station 27.

In use and in accordance with an implementing embodiment of the method for checking tyres according to the present invention, whenever a finished tyre 2 comes out from the vulcanization unit 14, it is transferred, for example through a conveyor that is not illustrated, to the apparatus 18 to carry out the checking thereof.

The tyre 2 is thus fed into each checking station 27 of the apparatus 18.

The tyre 2, not mounted on a rim (thus deflated), is rested with a sidewall 11 on the support surface 36 of the rotating table 35 of the checking station 27. The support surface 36 is oriented so that its first direction X coincides with the substantially rectilinear advancing direction F. The tyre 2 rested on the sidewall 11 has the second outer lateral surface 21 (and the first axial half 2a) facing upwards.

At this point the computer 48 takes care of managing the centering operation described above, adapted for aligning, in the horizontal plane x, y of the support surface 36 of the rotating table 35, the rotation axis R of the tyre 2 with the vertical rotation axis of the rotating table 35. The centering operation is carried out with the rotating table 35 stationary, in rest position where the first direction X coincides with the advancing direction F. The centering operation firstly comprises the estimation of the position of the centre of the tyre 2 and, therefore, of the rotation axis R of the tyre 2. Such an estimation is carried out by acquiring a suitable number of images 23 with the image acquisition apparatus 47 and the illumination system; by combining, as described above, such images 23 so as to obtain the working image 24 and implementing, on such a working image 24, suitable algorithms adapted for implementing the estimation procedure of the position of the rotation axis R of the tyre 2.

Once the centering operation has been carried out, the robotized arms of the tools 60 are moved in the manoeuvring space until the respective checking devices are brought to the tyre 2.

Keeping the checking devices in fixed position, the rotating table 35 and the tyre 2 are rotated around the vertical reference axis Z. During such a rotation, the checking devices carry out a cycle of checks on the first axial half 2a of the tyre 2. Such checks can be carried out in successive cycles and at every cycle the checking devices of the same checking station 27 are arranged in different positions to check different portions of the same tyre 2.

It should be observed that, once centred, the tyre 2 has its rotation axis R substantially coinciding with the vertical rotation axis of the rotating table 35 in turn coinciding with the vertical reference axis Z. In such a situation, the robotized arms can advantageously be positioned in the positions assigned as a function of the model of tyre 2, without the risk of collision with the tyre 2 while it is in rotation on the rotating table 35. Moreover, the centering advantageously ensures that the images acquired during the rotation of the tyre 2 are properly focused and within the field of view of the video camera(s).

Once the checking cycles have ended, the rotation of the rotating table 35 is stopped with the first direction X aligned with the feeding direction F and the robotized arms are taken away from the tyre 2.

The tyre 2 is thus discharged from the first checking station 27 and fed into a subsequent checking station 27 of the apparatus 18 where the tyre 2 is centred and analysed with analogous modes to what was described for the first checking station 27.

Once the inspection of the first axial half 2a of the tyre 2 has ended, the checks are preferably repeated on the second axial half 2b of the tyre in suitable checking stations 27 of the apparatus 18, with analogous modes to what has been described above for the first axial half 2a.

The invention claimed is:

1. A checking station for checking a tyre for vehicle wheels, comprising:
    a background comprising a support surface for the tyre, the support surface lying on a plane perpendicular to a reference axis;
    an image acquisition apparatus configured to acquire at least one image of the tyre arranged with a first outer lateral surface of the tyre in contact with the support surface and a second outer lateral surface of the tyre facing the image acquisition apparatus;
    an illumination system configured to illuminate the tyre by illuminating at least the second outer lateral surface of the tyre and an area circumferentially surrounding the tyre, the circumferentially surrounding area corresponding to at least one part of the background, including at least one part of the support surface; and
    a computer configured to generate a working image from the at least one acquired image of the tyre, the working image comprising the second outer lateral surface of the tyre and the circumferentially surrounding area;
    wherein:
        the image acquisition apparatus, the illumination system and the background are configured to generate a contrast, in the working image, between at least the entire second outer lateral surface of the tyre and the circumferentially surrounding area, in terms of color or grey level, among pixels in the working image that correspond to the at least the entire second outer lateral surface of the tyre and among pixels in the working image that correspond to the circumferentially surrounding area,
        the illumination system is configured to illuminate, in a single step or in multiple successive illumination steps, at least the entire second outer lateral surface of the tyre according to an angularly uniform illumination with respect to the reference axis, and
        acquisition of the at least one image of the tyre through the image acquisition apparatus and illumination of the tyre through the illumination system are carried out with the tyre in a stationary condition.

2. The checking station according to claim 1, wherein the image acquisition apparatus comprises a color camera.

3. The checking station according to claim 2, wherein the at least one part of background to which the circumferentially surrounding area corresponds is made in at least one color different from black and grey.

4. The checking station according to claim 1, wherein the image acquisition apparatus comprises a black and white camera.

5. The checking station according to claim 1, wherein the illumination system comprises a first illumination assembly configured to illuminate the at least the second outer lateral surface of the tyre according to an angularly uniform illumination with respect to the reference axis and a second illumination assembly configured to illuminate the circumferentially surrounding area.

6. The checking station according to claim 5, wherein, in a plane substantially perpendicular to the reference axis, the first illumination assembly is arranged according to a circular shape, including any shape that can be circumscribed by or inscribed in a circle, centered with respect to the reference axis.

7. The checking station according to claim 5, wherein the first illumination assembly comprises an illumination device that, at a set distance from the support surface, develops in a plane substantially perpendicular to the reference axis according to a circular shape, including any shape that can be circumscribed by or inscribed in a circle, substantially centered with respect to the reference axis.

8. The checking station according to claim 5, wherein the first illumination assembly comprises a plurality of illumination devices arranged around the support surface and facing the support surface.

9. The checking station according to claim 8, wherein the plurality of illumination devices is configured to illuminate respective different portions of the at least the second outer lateral surface of the tyre.

10. The checking station according to claim 9, wherein the plurality of illumination devices is configured to illuminate the at least the second outer lateral surface of the tyre from different angles.

11. The checking station according to claim 8, wherein the illumination devices of the plurality of illumination devices have a greater dimension along a direction parallel to the reference axis.

12. The checking station according to claim 8, wherein the illumination devices of the plurality of illumination devices are symmetrically arranged with respect to the reference axis.

13. The checking station according to claim 8, wherein the illumination devices of the plurality of illumination devices are angularly equidistant with respect to the reference axis.

14. The checking station according to claim 13, wherein the illumination devices of the plurality of illumination devices are arranged at vertices of a polygon having a number of sides greater than or equal to 4.

15. The checking station according to claim 5, wherein the second illumination assembly comprises illumination devices arranged around the support surface, configured to illuminate respective different portions of the circumferentially surrounding area.

16. The checking station according to claim 15, wherein the illumination devices of the second illumination assembly have a greater dimension along a direction perpendicular to the reference axis.

17. The checking station according to claim 15, wherein the illumination devices of the second illumination assembly are arranged at vertices of a polygon having a number of sides greater than or equal to 3.

18. The checking station according to claim 15, wherein the second illumination assembly comprises screens associated with the illumination devices of the second illumination assembly, configured to direct the light emitted from the illumination devices to the circumferentially surrounding area.

19. The checking station according to claim 5, wherein the computer is configured to activate the first illumination assembly and the second illumination assembly in sequence, one after the other, during the acquisition of the at least one image of the tyre by the image acquisition apparatus.

20. The checking station according to claim 1, wherein the computer is configured to carry out a centering operation, to align the rotation axis of the tyre with the reference axis, by processing the generated working image.

21. The checking station according to claim 20, wherein the computer is configured to process the working image to detect a deviation, on the plane of the support surface, between the reference axis and the rotation axis of the tyre.

22. The checking station according to claim 21, further comprising at least one actuator operatively connected to the support surface to move the support surface according to two directions belonging to the plane.

23. The checking station according to claim 22, wherein, in presence of the deviation, the computer is configured to drive the at least one actuator to move the support surface according to at least one of the two directions until substantially aligning the rotation axis of the tyre with the reference axis.

24. The checking station according to claim 1, wherein the image acquisition apparatus comprises an optical axis substantially coinciding with the reference axis.

25. The checking station according to claim 1, further comprising a rotating table configured to rotate around a rotation axis substantially coinciding with the reference axis, the rotating table defining the support surface.

26. The checking station according to claim 1, wherein the circumferentially surrounding area is radially external to the outer surface of the tyre.

\* \* \* \* \*